United States Patent
Imamura

(10) Patent No.: US 8,094,985 B2
(45) Date of Patent: Jan. 10, 2012

(54) MULTI-CORE HOLEY FIBER AND OPTICAL TRANSMISSION SYSTEM

(75) Inventor: Katsunori Imamura, Tokyo (JP)

(73) Assignee: Furukawa Electric Co., Ltd., Tpkyo (JP)

( * ) Notice: Subject to any disclaimer, the term of this patent is extended or adjusted under 35 U.S.C. 154(b) by 303 days.

(21) Appl. No.: 12/546,894

(22) Filed: Aug. 25, 2009

(65) Prior Publication Data

US 2010/0054742 A1 Mar. 4, 2010

(30) Foreign Application Priority Data

Aug. 29, 2008 (JP) ................................. 2008-222806

(51) Int. Cl.
G02B 6/02 (2006.01)
(52) U.S. Cl. ........................................ 385/125; 385/123
(58) Field of Classification Search ........... 385/123–128
See application file for complete search history.

(56) References Cited

U.S. PATENT DOCUMENTS

| | | | |
|---|---|---|---|
| 7,609,928 B2 | 10/2009 | Imamura | |
| 7,613,374 B2 | 11/2009 | Imamura | |
| 7,657,141 B2 * | 2/2010 | Imamura | 385/125 |
| 7,693,379 B2 * | 4/2010 | Imamura | 385/125 |
| 2008/0219667 A1 | 9/2008 | Imamura | |
| 2008/0310807 A1 | 12/2008 | Imamura | |
| 2009/0080845 A1 | 3/2009 | Imamura | |
| 2009/0097810 A1 | 4/2009 | Imamura | |
| 2009/0148112 A1 | 6/2009 | Koyamada et al. | |
| 2009/0324242 A1 * | 12/2009 | Imamura | 398/142 |
| 2010/0290750 A1 * | 11/2010 | Imamura | 385/126 |
| 2010/0296784 A1 * | 11/2010 | Imamura | 385/126 |
| 2011/0176776 A1 * | 7/2011 | Imamura | 385/59 |

FOREIGN PATENT DOCUMENTS

WO WO 2006/100488 A1 9/2006

OTHER PUBLICATIONS

Koji Ieda, et al., "Visible to Infrared High-Speed WDM Transmission Over PCF", IEICE Electronics Express, vol. 4, No. 12, Jun. 25, 2007, pp. 375-379.

Kenji Kurokawa, et al., "Penalty-Free Dispersion-Managed Soliton Transmission Over a 100-km Low-Loss PCF", Journal of Lightwave Technology, vol. 24, No. 1, Jan. 2006, pp. 32-37.

(Continued)

Primary Examiner — Kevin S Wood
(74) Attorney, Agent, or Firm — Oblon, Spivak, McClelland, Maier & Neustadt, L.L.P.

(57) ABSTRACT

A multi-core holey fiber with suppression of crosstalk deterioration among transmitted optical signals in a plurality of cores, and an optical transmission system using the fiber are disclosed. The multi-core holey fiber comprises a plurality of cores arranged separately from each other, and a cladding surrounding the plurality of cores wherein the cladding has plurality of holes arranged in a triangular lattice shape to create hole layers around the plurality of cores. Additionally, $d/\Lambda$ is not more than 0.5, where $\Lambda$ [μm] is lattice constant of the triangular lattice, $d$ [μm] is diameter of each of the holes; a distance between adjacent cores is equivalent to not less than six hole layers; the cores arranged farthest from the center of the multi-core holey fiber is surrounded by not less three hole layers; and the sum of the coupling coefficients between the adjacent cores is not more than $1.6 \times 10^{-5}$/m.

8 Claims, 20 Drawing Sheets

OTHER PUBLICATIONS

K. Tajima, "Low Loss PCF by Reduction of Hole Surface Imperfection", ECOC, PDS2.1, 2007, 2 pages.

Masanori Koshiba, et al., "Applicability of Classical Optical Fiber Theories to Holey Fibers", Optics Letters, vol. 29, No. 15, Aug. 1, 2004, pp. 1739-1741.

U.S. Appl. No. 12/545,236, filed Aug. 21, 2009, Imamura.
U.S. Appl. No. 13/045,039, filed Mar. 10, 2011, Imamura.
U.S. Appl. No. 12/843,302, filed Jul. 26, 2010, Imamura.
U.S. Appl. No. 12/846,028, filed Jul. 29, 2010, Imamura.

* cited by examiner

| d/Λ=0.5 Coupling length = 100km | Λ | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| | | | | | 2-core | 3-core | 4-core | 5-core | 6-core | 7-core | | 1-core | 2-core | 3-core | 4-core | 5-core | 6-core | 7-core |
| | μm | μm | μm² | # of layers | # of layers | # of layers | # of layers | # of layers | # of layers | # of layers | | μm | μm | μm | μm | μm | μm | μm |
| Example 1 | 2 | 0.099 | 6.6 | 5 | 8 | 9 | 9 | 9 | 9 | 9 | | 24 | 42 | 46 | 57 | 64 | 68 | 64 |
| Example 2 | 3 | 0.190 | 12.5 | 5 | 8 | 8 | 8 | 8 | 8 | 8 | | 36 | 63 | 65 | 79 | 89 | 94 | 89 |
| Example 3 | 4 | 0.293 | 20.6 | 5 | 7 | 7 | 8 | 8 | 8 | 8 | | 48 | 79 | 81 | 106 | 119 | 126 | 119 |
| Example 4 | 5 | 0.408 | 30.9 | 4 | 7 | 7 | 7 | 7 | 7 | 7 | | 50 | 88 | 91 | 113 | 127 | 134 | 127 |
| Example 5 | 6 | 0.534 | 43.2 | 4 | 7 | 7 | 7 | 7 | 7 | 7 | | 59 | 106 | 109 | 135 | 152 | 161 | 152 |
| Example 6 | 7 | 0.672 | 57.8 | 4 | 6 | 7 | 7 | 7 | 7 | 7 | | 69 | 116 | 127 | 158 | 177 | 188 | 177 |
| Example 7 | 8 | 0.822 | 74.5 | 4 | 6 | 6 | 7 | 7 | 7 | 7 | | 79 | 132 | 136 | 180 | 202 | 215 | 202 |
| Example 8 | 9 | 0.983 | 93.3 | 4 | 6 | 6 | 6 | 7 | 7 | 7 | | 89 | 149 | 153 | 186 | 228 | 242 | 228 |
| Example 9 | 10 | 1.155 | 114.2 | 4 | 6 | 6 | 6 | 6 | 6 | 6 | | 99 | 165 | 170 | 207 | 231 | 244 | 231 |
| Example 10 | 11 | 1.340 | 137.4 | 4 | 6 | 6 | 6 | 6 | 6 | 6 | | 109 | 182 | 187 | 227 | 254 | 268 | 254 |
| Example 11 | 12 | 1.536 | 162.6 | 4 | 6 | 6 | 6 | 6 | 6 | 6 | | 119 | 198 | 204 | 248 | 277 | 293 | 277 |
| Example 12 | 13 | 1.743 | 190.0 | 4 | 6 | 6 | 6 | 6 | 6 | 6 | | 129 | 215 | 221 | 269 | 300 | 317 | 300 |
| Example 13 | 14 | 1.962 | 219.4 | 3 | 6 | 6 | 6 | 6 | 6 | 6 | | 108 | 200 | 208 | 260 | 293 | 312 | 293 |

| d/Λ=0.5 Coupling length = 10000km | Λ (μm) | Wavelength λ1 when bending loss becomes 10dB/m (μm) | Aeff @1550nm (μm²) | Outer most layers # of layers | Core interval | | | | | | | Diameter of the fiber | | | | | | |
|---|---|---|---|---|---|---|---|---|---|---|---|---|---|---|---|---|---|---|
| | | | | | 2-core # of layers | 3-core # of layers | 4-core # of layers | 5-core # of layers | 6-core # of layers | 7-core # of layers | | 1-core μm | 2-core μm | 3-core μm | 4-core μm | 5-core μm | 6-core μm | 7-core μm |
| Example 14 | 2 | 0.099 | 6.6 | 5 | 10 | 10 | 10 | 10 | 10 | 10 | | 24 | 46 | 48 | 60 | 68 | 73 | 68 |
| Example 15 | 3 | 0.190 | 12.5 | 5 | 9 | 9 | 9 | 9 | 9 | 9 | | 36 | 66 | 68 | 85 | 96 | 102 | 96 |
| Example 16 | 4 | 0.293 | 20.6 | 5 | 9 | 9 | 9 | 9 | 9 | 9 | | 48 | 88 | 91 | 113 | 128 | 136 | 128 |
| Example 17 | 5 | 0.408 | 30.9 | 4 | 8 | 8 | 8 | 9 | 9 | 9 | | 50 | 94 | 97 | 122 | 149 | 160 | 149 |
| Example 18 | 6 | 0.534 | 43.2 | 4 | 8 | 8 | 8 | 8 | 8 | 8 | | 59 | 112 | 117 | 146 | 165 | 176 | 165 |
| Example 19 | 7 | 0.672 | 57.8 | 4 | 8 | 8 | 8 | 8 | 8 | 8 | | 69 | 131 | 136 | 171 | 193 | 206 | 193 |
| Example 20 | 8 | 0.822 | 74.5 | 4 | 7 | 8 | 8 | 8 | 8 | 8 | | 79 | 141 | 155 | 195 | 220 | 235 | 220 |
| Example 21 | 9 | 0.983 | 93.3 | 4 | 7 | 7 | 7 | 8 | 8 | 8 | | 89 | 158 | 164 | 219 | 248 | 264 | 248 |
| Example 22 | 10 | 1.155 | 114.2 | 4 | 7 | 7 | 7 | 7 | 7 | 8 | | 99 | 176 | 182 | 225 | 253 | 269 | 275 |
| Example 23 | 11 | 1.340 | 137.4 | 4 | 7 | 7 | 7 | 7 | 7 | 7 | | 109 | 194 | 200 | 248 | 278 | 296 | 278 |
| Example 24 | 12 | 1.536 | 162.6 | 4 | 7 | 7 | 7 | 7 | 7 | 7 | | 119 | 211 | 218 | 270 | 304 | 323 | 304 |
| Example 25 | 13 | 1.743 | 190.0 | 4 | 7 | 7 | 7 | 7 | 7 | 7 | | 129 | 229 | 236 | 293 | 329 | 349 | 329 |
| Example 26 | 14 | 1.962 | 219.4 | 3 | 7 | 7 | 7 | 7 | 7 | 7 | | 108 | 216 | 225 | 286 | 323 | 348 | 323 |

| d/Λ=0.48 Coupling length = 100km | Λ | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| | | | | | 2-core | 3-core | 4-core | 5-core | 6-core | 7-core | | 1-core | 2-core | 3-core | 4-core | 5-core | 6-core | 7-core |
| | μm | μm | μm² | # of layers | # of layers | # of layers | # of layers | # of layers | # of layers | # of layers | | μm | μm | μm | μm | μm | μm | μm |
| Example 27 | 2 | 0.098 | 6.7 | 6 | 9 | 9 | 9 | 9 | 9 | 9 | | 29 | 48 | 50 | 61 | 68 | 72 | 68 |
| Example 28 | 3 | 0.196 | 12.9 | 5 | 8 | 8 | 8 | 8 | 8 | 9 | | 36 | 63 | 65 | 79 | 89 | 94 | 96 |
| Example 29 | 4 | 0.306 | 21.4 | 5 | 8 | 8 | 8 | 8 | 8 | 9 | | 48 | 84 | 86 | 106 | 119 | 126 | 119 |
| Example 30 | 5 | 0.427 | 32.0 | 4 | 7 | 7 | 8 | 8 | 8 | 8 | | 61 | 99 | 102 | 132 | 149 | 157 | 149 |
| Example 31 | 6 | 0.560 | 44.9 | 4 | 7 | 7 | 7 | 7 | 8 | 8 | | 59 | 106 | 109 | 135 | 152 | 161 | 152 |
| Example 32 | 7 | 0.705 | 60.0 | 4 | 7 | 7 | 7 | 7 | 7 | 7 | | 69 | 123 | 127 | 158 | 177 | 188 | 177 |
| Example 33 | 8 | 0.861 | 77.3 | 4 | 7 | 7 | 7 | 7 | 7 | 7 | | 79 | 141 | 146 | 180 | 202 | 215 | 202 |
| Example 34 | 9 | 1.030 | 96.8 | 4 | 6 | 7 | 7 | 7 | 7 | 7 | | 89 | 149 | 164 | 203 | 228 | 242 | 228 |
| Example 35 | 10 | 1.209 | 118.5 | 4 | 6 | 6 | 7 | 7 | 7 | 7 | | 99 | 165 | 170 | 225 | 253 | 269 | 253 |
| Example 36 | 11 | 1.401 | 142.5 | 4 | 6 | 6 | 6 | 7 | 7 | 7 | | 109 | 182 | 187 | 227 | 278 | 296 | 278 |
| Example 37 | 12 | 1.604 | 168.7 | 4 | 6 | 6 | 6 | 6 | 7 | 6 | | 119 | 198 | 204 | 248 | 277 | 293 | 277 |
| Example 38 | 13 | 1.819 | 197.0 | 4 | 6 | 6 | 6 | 6 | 6 | 6 | | 129 | 215 | 221 | 269 | 300 | 317 | 300 |
| Example 39 | 14 | 2.046 | 227.5 | 4 | 6 | 6 | 6 | 6 | 6 | 6 | | 139 | 231 | 238 | 289 | 323 | 341 | 323 |

Figure 10

| d/Λ=0.48 Coupling length = 10000km | Λ | Wavelength λ1 when bending loss becomes 10dB/m | Aeff @1550 nm | Core interval — # of layers | | | | | | | Diameter of the fiber | | | | | | |
|---|---|---|---|---|---|---|---|---|---|---|---|---|---|---|---|---|---|
| | | | | Outer most layers | 2-core | 3-core | 4-core | 5-core | 6-core | 7-core | 1-core | 2-core | 3-core | 4-core | 5-core | 6-core | 7-core |
| | μm | μm | μm² | # of layers | # of layers | # of layers | # of layers | # of layers | # of layers | # of layers | μm | μm | μm | μm | μm | μm | μm |
| Example 40 | 2 | 0.098 | 6.7 | 6 | 10 | 10 | 10 | 11 | 11 | 11 | 29 | 51 | 52 | 65 | 77 | 82 | 77 |
| Example 41 | 3 | 0.196 | 12.9 | 5 | 9 | 10 | 10 | 10 | 10 | 10 | 36 | 66 | 72 | 91 | 102 | 109 | 102 |
| Example 42 | 4 | 0.306 | 21.4 | 5 | 9 | 9 | 9 | 10 | 10 | 10 | 48 | 88 | 91 | 113 | 128 | 136 | 136 |
| Example 43 | 5 | 0.427 | 32.0 | 5 | 9 | 9 | 9 | 9 | 9 | 9 | 61 | 110 | 114 | 142 | 160 | 170 | 160 |
| Example 44 | 6 | 0.560 | 44.9 | 4 | 8 | 8 | 9 | 9 | 9 | 9 | 59 | 112 | 117 | 158 | 178 | 191 | 178 |
| Example 45 | 7 | 0.705 | 60.0 | 4 | 8 | 8 | 8 | 9 | 8 | 8 | 69 | 131 | 136 | 171 | 193 | 206 | 193 |
| Example 46 | 8 | 0.861 | 77.3 | 4 | 8 | 8 | 8 | 8 | 8 | 8 | 79 | 150 | 155 | 195 | 220 | 235 | 220 |
| Example 47 | 9 | 1.030 | 96.8 | 4 | 8 | 8 | 8 | 8 | 8 | 8 | 89 | 168 | 175 | 219 | 248 | 264 | 248 |
| Example 48 | 10 | 1.209 | 118.5 | 4 | 7 | 8 | 8 | 8 | 8 | 8 | 99 | 176 | 194 | 244 | 275 | 294 | 275 |
| Example 49 | 11 | 1.401 | 142.5 | 4 | 7 | 7 | 8 | 8 | 8 | 8 | 109 | 194 | 200 | 268 | 303 | 323 | 303 |
| Example 50 | 12 | 1.604 | 168.7 | 4 | 7 | 7 | 7 | 8 | 8 | 8 | 119 | 211 | 218 | 270 | 330 | 353 | 330 |
| Example 51 | 13 | 1.819 | 197.0 | 4 | 7 | 7 | 7 | 7 | 7 | 8 | 129 | 229 | 236 | 293 | 329 | 349 | 358 |
| Example 52 | 14 | 2.046 | 227.5 | 4 | 7 | 7 | 7 | 7 | 7 | 7 | 139 | 246 | 255 | 315 | 354 | 376 | 354 |

Figure 11

| d/Λ=0.45 Coupling length = 100km | Λ | Wavelength λ1 when bending loss becomes 10dB/m | Aeff @1550 nm | Outer most layers # of layers | Core interval | | | | | | | Diameter of the fiber | | | | | | |
|---|---|---|---|---|---|---|---|---|---|---|---|---|---|---|---|---|---|---|
| | | | | | 2-core # of layers | 3-core # of layers | 4-core # of layers | 5-core # of layers | 6-core # of layers | 7-core # of layers | | 1-core | 2-core | 3-core | 4-core | 5-core | 6-core | 7-core |
| | μm | μm | μm² | | | | | | | | | μm | μm | μm | μm | μm | μm | μm |
| Example 53 | 2 | 0.103 | 7.1 | 6 | 9 | 10 | 10 | 10 | 10 | 10 | | 29 | 48 | 52 | 65 | 73 | 77 | 73 |
| Example 54 | 3 | 0.215 | 13.7 | 6 | 9 | 9 | 9 | 9 | 9 | 9 | | 43 | 73 | 75 | 91 | 102 | 108 | 102 |
| Example 55 | 4 | 0.339 | 22.7 | 5 | 8 | 8 | 9 | 9 | 9 | 9 | | 48 | 84 | 86 | 113 | 128 | 136 | 128 |
| Example 56 | 5 | 0.476 | 33.9 | 5 | 8 | 8 | 8 | 8 | 8 | 8 | | 61 | 105 | 108 | 132 | 149 | 157 | 149 |
| Example 57 | 6 | 0.625 | 47.6 | 5 | 7 | 8 | 8 | 8 | 8 | 8 | | 73 | 119 | 129 | 159 | 178 | 189 | 178 |
| Example 58 | 7 | 0.788 | 63.5 | 5 | 7 | 7 | 8 | 8 | 8 | 8 | | 85 | 139 | 142 | 185 | 208 | 220 | 208 |
| Example 59 | 8 | 0.964 | 81.8 | 4 | 7 | 7 | 7 | 7 | 7 | 8 | | 79 | 141 | 146 | 180 | 202 | 215 | 220 |
| Example 60 | 9 | 1.152 | 102.5 | 4 | 7 | 7 | 7 | 7 | 7 | 7 | | 89 | 158 | 164 | 203 | 228 | 242 | 228 |
| Example 61 | 10 | 1.353 | 125.4 | 4 | 7 | 7 | 7 | 7 | 7 | 7 | | 99 | 176 | 182 | 225 | 253 | 269 | 253 |
| Example 62 | 11 | 1.568 | 150.7 | 4 | 7 | 7 | 7 | 7 | 7 | 7 | | 109 | 194 | 200 | 248 | 278 | 296 | 278 |
| Example 63 | 12 | 1.795 | 178.4 | 4 | 6 | 7 | 7 | 7 | 7 | 7 | | 119 | 198 | 218 | 270 | 304 | 323 | 304 |
| Example 64 | 13 | 2.035 | 208.4 | 4 | 6 | 7 | 7 | 7 | 7 | 7 | | 129 | 215 | 236 | 293 | 329 | 349 | 329 |
| Example 65 | 14 | 2.288 | 240.8 | 4 | 6 | 6 | 7 | 7 | 7 | 7 | | 139 | 231 | 238 | 315 | 354 | 376 | 354 |

Figure 12

| d/Λ=0.45 Coupling length = 10000km | Λ | Wavelength λ1 when bending loss becomes 10dB/m | Aeff @1550 nm | Outer most layers # of layers | Core interval | | | | | | | Diameter of the fiber | | | | | | |
|---|---|---|---|---|---|---|---|---|---|---|---|---|---|---|---|---|---|---|
| | | | | | 2-core # of layers | 3-core # of layers | 4-core # of layers | 5-core # of layers | 6-core # of layers | 7-core # of layers | | 1-core | 2-core | 3-core | 4-core | 5-core | 6-core | 7-core |
| | μm | μm | μm² | | | | | | | | | μm | μm | μm | μm | μm | μm | μm |
| Example 66 | 2 | 0.103 | 7.1 | 6 | 11 | 11 | 11 | 12 | 12 | 12 | | 29 | 53 | 55 | 68 | 81 | 87 | 81 |
| Example 67 | 3 | 0.215 | 13.7 | 6 | 10 | 10 | 11 | 11 | 11 | 11 | | 43 | 76 | 78 | 102 | 116 | 123 | 116 |
| Example 68 | 4 | 0.339 | 22.7 | 5 | 10 | 10 | 10 | 10 | 10 | 10 | | 48 | 92 | 96 | 121 | 136 | 146 | 136 |
| Example 69 | 5 | 0.476 | 33.9 | 5 | 9 | 9 | 10 | 10 | 10 | 10 | | 61 | 110 | 114 | 151 | 171 | 182 | 171 |
| Example 70 | 6 | 0.625 | 47.6 | 5 | 9 | 9 | 9 | 9 | 9 | 9 | | 73 | 132 | 137 | 170 | 191 | 204 | 191 |
| Example 71 | 7 | 0.788 | 63.5 | 5 | 9 | 9 | 9 | 9 | 9 | 9 | | 85 | 154 | 159 | 198 | 223 | 238 | 223 |
| Example 72 | 8 | 0.964 | 81.8 | 4 | 8 | 9 | 9 | 9 | 9 | 9 | | 79 | 150 | 165 | 210 | 238 | 255 | 238 |
| Example 73 | 9 | 1.152 | 102.5 | 4 | 8 | 8 | 9 | 9 | 9 | 9 | | 89 | 168 | 175 | 236 | 267 | 287 | 267 |
| Example 74 | 10 | 1.353 | 125.4 | 4 | 8 | 8 | 8 | 9 | 9 | 9 | | 99 | 187 | 194 | 244 | 275 | 294 | 297 |
| Example 75 | 11 | 1.568 | 150.7 | 4 | 8 | 8 | 8 | 8 | 8 | 8 | | 109 | 206 | 214 | 268 | 303 | 323 | 303 |
| Example 76 | 12 | 1.795 | 178.4 | 4 | 8 | 8 | 8 | 8 | 8 | 8 | | 119 | 224 | 233 | 293 | 330 | 353 | 330 |
| Example 77 | 13 | 2.035 | 208.4 | 4 | 8 | 8 | 8 | 8 | 8 | 8 | | 129 | 243 | 252 | 317 | 358 | 382 | 358 |
| Example 78 | 14 | 2.288 | 240.8 | 4 | 7 | 8 | 8 | 8 | 8 | 8 | | 139 | 246 | 272 | 341 | 385 | 411 | 385 |

Figure 13

| d/Λ=0.43 | Λ | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| Coupling length = 100km | | | | # of layers | 2-core # of layers | 3-core # of layers | 4-core # of layers | 5-core # of layers | 6-core # of layers | 7-core # of layers | | 1-core | 2-core | 3-core | 4-core | 5-core | 6-core | 7-core |
| | μm | μm | μm² | | | | | | | | | μm | μm | μm | μm | μm | μm | μm |
| Example 79 | 2 | 0.112 | 7.5 | 6 | 10 | 10 | 10 | 10 | 10 | 11 | | 29 | 51 | 52 | 65 | 73 | 77 | 77 |
| Example 80 | 3 | 0.234 | 14.4 | 6 | 9 | 9 | 9 | 10 | 10 | 10 | | 43 | 73 | 75 | 91 | 109 | 116 | 109 |
| Example 81 | 4 | 0.370 | 23.7 | 5 | 9 | 9 | 9 | 9 | 9 | 9 | | 48 | 88 | 91 | 113 | 128 | 136 | 128 |
| Example 82 | 5 | 0.521 | 35.4 | 5 | 8 | 8 | 9 | 9 | 9 | 9 | | 61 | 105 | 108 | 142 | 160 | 170 | 160 |
| Example 83 | 6 | 0.686 | 49.5 | 5 | 8 | 8 | 8 | 8 | 8 | 8 | | 73 | 125 | 129 | 159 | 178 | 189 | 178 |
| Example 84 | 7 | 0.866 | 66.1 | 5 | 8 | 8 | 8 | 8 | 8 | 8 | | 85 | 146 | 151 | 185 | 208 | 220 | 208 |
| Example 85 | 8 | 1.060 | 85.1 | 5 | 7 | 8 | 8 | 8 | 8 | 8 | | 97 | 158 | 172 | 212 | 238 | 252 | 238 |
| Example 86 | 9 | 1.268 | 106.5 | 5 | 7 | 7 | 8 | 8 | 8 | 8 | | 109 | 178 | 183 | 238 | 267 | 283 | 267 |
| Example 87 | 10 | 1.491 | 130.4 | 4 | 7 | 7 | 7 | 7 | 7 | 8 | | 99 | 176 | 182 | 225 | 253 | 269 | 275 |
| Example 88 | 11 | 1.728 | 156.7 | 4 | 7 | 7 | 7 | 7 | 7 | 7 | | 109 | 194 | 200 | 248 | 278 | 296 | 278 |
| Example 89 | 12 | 1.980 | 185.4 | 4 | 7 | 7 | 7 | 7 | 7 | 7 | | 119 | 211 | 218 | 270 | 304 | 323 | 304 |
| Example 90 | 13 | 2.246 | 216.6 | 4 | 7 | 7 | 7 | 7 | 7 | 7 | | 129 | 229 | 236 | 293 | 329 | 349 | 329 |
| Example 91 | 14 | 2.526 | 250.4 | 4 | 7 | 7 | 7 | 7 | 7 | 7 | | 139 | 246 | 255 | 315 | 354 | 376 | 354 |

| d/Λ=0.43 Coupling length = 10000km | Λ | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| | | | | | 2-core | 3-core | 4-core | 5-core | 6-core | 7-core | | 1-core | 2-core | 3-core | 4-core | 5-core | 6-core | 7-core |
| | μm | μm | μm² | # of layers | # of layers | # of layers | # of layers | # of layers | # of layers | # of layers | | μm | μm | μm | μm | μm | μm | μm |
| Example 92 | 2 | 0.112 | 7.5 | 6 | 11 | 12 | 12 | 12 | 12 | 12 | | 29 | 53 | 57 | 72 | 81 | 87 | 81 |
| Example 93 | 3 | 0.234 | 14.4 | 6 | 11 | 11 | 11 | 11 | 11 | 11 | | 43 | 79 | 82 | 102 | 116 | 123 | 116 |
| Example 94 | 4 | 0.370 | 23.7 | 5 | 10 | 10 | 11 | 10 | 11 | 11 | | 48 | 92 | 96 | 128 | 145 | 156 | 145 |
| Example 95 | 5 | 0.521 | 35.4 | 5 | 10 | 10 | 10 | 10 | 10 | 10 | | 61 | 116 | 120 | 151 | 171 | 182 | 171 |
| Example 96 | 6 | 0.686 | 49.5 | 5 | 9 | 10 | 10 | 10 | 10 | 10 | | 73 | 132 | 144 | 181 | 205 | 219 | 205 |
| Example 97 | 7 | 0.866 | 66.1 | 5 | 9 | 9 | 9 | 10 | 10 | 10 | | 85 | 154 | 159 | 198 | 239 | 255 | 239 |
| Example 98 | 8 | 1.060 | 85.1 | 5 | 9 | 9 | 9 | 9 | 9 | 9 | | 97 | 176 | 182 | 227 | 255 | 272 | 255 |
| Example 99 | 9 | 1.268 | 106.5 | 5 | 9 | 9 | 9 | 9 | 9 | 9 | | 109 | 198 | 205 | 255 | 287 | 306 | 287 |
| Example 100 | 10 | 1.491 | 130.4 | 4 | 8 | 9 | 9 | 9 | 9 | 9 | | 99 | 187 | 207 | 263 | 297 | 319 | 297 |
| Example 101 | 11 | 1.728 | 156.7 | 4 | 8 | 9 | 9 | 9 | 9 | 9 | | 109 | 206 | 214 | 289 | 327 | 351 | 327 |
| Example 102 | 12 | 1.980 | 185.4 | 4 | 8 | 8 | 9 | 9 | 9 | 9 | | 119 | 224 | 233 | 293 | 356 | 383 | 356 |
| Example 103 | 13 | 2.246 | 216.6 | 4 | 8 | 8 | 8 | 8 | 8 | 9 | | 129 | 243 | 252 | 317 | 358 | 382 | 386 |
| Example 104 | 14 | 2.526 | 250.4 | 4 | 8 | 8 | 8 | 8 | 8 | 8 | | 139 | 262 | 272 | 341 | 385 | 411 | 385 |

Figure 15

| d/Λ=0.40 Coupling length = 100km | Λ | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| | | | | | 2-core | 3-core | 4-core | 5-core | 6-core | 7-core | | 1-core | 2-core | 3-core | 4-core | 5-core | 6-core | 7-core |
| | μm | μm | μm² | # of layers | # of layers | # of layers | # of layers | # of layers | # of layers | # of layers | | μm | μm | μm | μm | μm | μm | μm |
| Example 105 | 2 | 0.132 | 8.4 | 7 | 11 | 11 | 11 | 11 | 11 | 11 | | 33 | 57 | 59 | 72 | 81 | 86 | 81 |
| Example 106 | 3 | 0.274 | 15.6 | 7 | 10 | 10 | 10 | 10 | 10 | 11 | | 50 | 83 | 85 | 103 | 116 | 122 | 122 |
| Example 107 | 4 | 0.433 | 25.4 | 6 | 9 | 10 | 10 | 10 | 10 | 10 | | 57 | 97 | 104 | 129 | 145 | 154 | 145 |
| Example 108 | 5 | 0.610 | 37.8 | 6 | 9 | 9 | 9 | 9 | 9 | 10 | | 72 | 121 | 124 | 152 | 171 | 180 | 182 |
| Example 109 | 6 | 0.805 | 52.7 | 5 | 8 | 9 | 9 | 9 | 9 | 9 | | 73 | 125 | 137 | 170 | 191 | 204 | 191 |
| Example 110 | 7 | 1.017 | 70.3 | 5 | 8 | 8 | 9 | 9 | 9 | 9 | | 85 | 146 | 151 | 198 | 223 | 238 | 223 |
| Example 111 | 8 | 1.248 | 90.4 | 5 | 8 | 8 | 8 | 8 | 8 | 9 | | 97 | 167 | 172 | 212 | 238 | 252 | 255 |
| Example 112 | 9 | 1.495 | 113.1 | 5 | 8 | 8 | 8 | 8 | 8 | 8 | | 109 | 188 | 194 | 238 | 267 | 283 | 267 |
| Example 113 | 10 | 1.761 | 138.4 | 5 | 8 | 8 | 8 | 8 | 8 | 8 | | 121 | 209 | 215 | 265 | 297 | 315 | 297 |
| Example 114 | 11 | 2.044 | 166.2 | 5 | 7 | 8 | 8 | 8 | 8 | 8 | | 133 | 218 | 237 | 291 | 327 | 346 | 327 |
| Example 115 | 12 | 2.345 | 196.7 | 5 | 7 | 7 | 7 | 8 | 8 | 8 | | 145 | 238 | 244 | 318 | 356 | 377 | 356 |
| Example 116 | 13 | 2.664 | 229.9 | 5 | 7 | 7 | 7 | 8 | 8 | 8 | | 157 | 257 | 264 | 320 | 386 | 409 | 386 |
| Example 117 | 14 | 3.000 | 266.0 | 4 | 7 | 7 | 7 | 8 | 8 | 8 | | 139 | 246 | 255 | 315 | 385 | 411 | 385 |

Figure 16

| d/Λ=0.40 | | Wavelength λ1 when bending loss becomes 10dB/m | Aeff @1550 nm | Outer most layers | Core interval | | | | | | | Diameter of the fiber | | | | | | |
|---|---|---|---|---|---|---|---|---|---|---|---|---|---|---|---|---|---|---|
| Coupling length = 10000km | Λ | | | | 2-core | 3-core | 4-core | 5-core | 6-core | 7-core | | 1-core | 2-core | 3-core | 4-core | 5-core | 6-core | 7-core |
| | | | | # of layers | # of layers | # of layers | # of layers | # of layers | # of layers | # of layers | | | | | | | | |
| | μm | μm | μm² | | | | | | | | | μm | μm | μm | μm | μm | μm | μm |
| Example 118 | 2 | 0.132 | 8.4 | 7 | 12 | 12 | 13 | 13 | 13 | 13 | | 33 | 59 | 61 | 80 | 90 | 96 | 90 |
| Example 119 | 3 | 0.274 | 15.6 | 7 | 11 | 12 | 12 | 12 | 12 | 12 | | 50 | 86 | 92 | 114 | 129 | 137 | 129 |
| Example 120 | 4 | 0.433 | 25.4 | 6 | 11 | 11 | 12 | 12 | 12 | 12 | | 57 | 106 | 109 | 144 | 163 | 174 | 163 |
| Example 121 | 5 | 0.610 | 37.8 | 6 | 10 | 11 | 11 | 11 | 11 | 11 | | 72 | 132 | 137 | 171 | 193 | 205 | 193 |
| Example 122 | 6 | 0.805 | 52.7 | 5 | 10 | 10 | 11 | 11 | 11 | 11 | | 73 | 139 | 144 | 192 | 218 | 234 | 218 |
| Example 123 | 7 | 1.017 | 70.3 | 5 | 10 | 10 | 10 | 10 | 10 | 10 | | 85 | 162 | 168 | 211 | 239 | 255 | 239 |
| Example 124 | 8 | 1.248 | 90.4 | 5 | 9 | 10 | 10 | 10 | 10 | 10 | | 97 | 185 | 192 | 242 | 273 | 292 | 273 |
| Example 125 | 9 | 1.495 | 113.1 | 5 | 9 | 10 | 10 | 10 | 10 | 10 | | 109 | 198 | 216 | 272 | 307 | 328 | 307 |
| Example 126 | 10 | 1.761 | 138.4 | 5 | 9 | 9 | 9 | 10 | 10 | 10 | | 121 | 220 | 228 | 283 | 341 | 365 | 341 |
| Example 127 | 11 | 2.044 | 166.2 | 5 | 9 | 9 | 9 | 9 | 9 | 9 | | 133 | 242 | 250 | 312 | 351 | 373 | 351 |
| Example 128 | 12 | 2.345 | 196.7 | 5 | 9 | 9 | 9 | 9 | 9 | 9 | | 145 | 264 | 273 | 340 | 383 | 407 | 383 |
| Example 129 | 13 | 2.664 | 229.9 | 5 | 9 | 9 | 9 | 9 | 9 | 9 | | 157 | 286 | 296 | 368 | 415 | 441 | 415 |
| Example 130 | 14 | 3.000 | 266.0 | 4 | 8 | 9 | 9 | 9 | 9 | 9 | | 139 | 262 | 289 | 368 | 416 | 447 | 416 |

Figure 17

MULTI-CORE HOLEY FIBER AND OPTICAL TRANSMISSION SYSTEM

CROSS-REFERENCES TO RELATED APPLICATIONS

This application claims the benefit of priority from Japanese Patent Application No. 2008-222806 filed Aug. 29, 2008, the entire contents of which is incorporated herein by reference.

TECHNICAL FIELD

The present invention relates to a multi-core holey fiber and an optical transmission system, which uses the multi-core holey fiber as an optical transmission line.

BACKGROUND OF THE INVENTION

Because of the developments in optical amplifiers and signal modulation/demodulation schemes, optical communication transmission capacity has increased rapidly. Also, because of the growth in Fiber-To-The-Home (FTTH), data demand has also increased, and it is necessary to increase transmission capacity even further in the future. One of the effective ways to increase transmission capacity is to increase the bandwidth of the used transmission wavelength band. And, as a way to increase the bandwidth, a holey fiber, which is a new type of an optical fiber having hole structure, can be used for broadband optical transmission. For example, K. Jeda, K. Kurokawa, K. Tajima and K. Nakajima, "Visible to infrared high-speed WDM transmission over PCF," IEICE Electron Express, vol. 4, no. 12, pp. 375-379 (2007), discloses a technique to perform 658~1556 nm broadband optical transmission over a transmission length of 1 km using a Photonic Crystal Fiber (PCF), which is one kind of the holey fiber. Also, with respect to the holey fiber, transmission loss and fiber length are also improved (see, for example, K. Kurokawa, K. Tajima, K. Tsujikawa, K. Nakajima, T. Matsui, I. Sankawa and T. Haibara, "Penalty-Free Dispersion-Managed Soliton Transmission Over a 100-km Low-Loss PCF," J. Lightwave Technol., vol. 24, no. 1, pp. 32-37 (2006), and K. Tajima, "Low loss PCF by reduction of holes surface imperfection," ECOC 2007, PDS2.1 (2007)). For example, Tajima et al. discloses a holey fiber with a relatively low transmission loss of 0.18 dB/km at a wavelength of 1550 nm. As stated above, broadband optical transmission using holey fiber has a large potential for commercialization in the near future.

Characteristics of the holey fiber are primarily based on the hole diameter (d), the distance between the closest holes ($\Lambda$), and the ratio of the two (d/$\Lambda$). According to M. Koshiba and K. Saitoh, "Applicability of classical optical fiber theories to holey fibers," Opt. Lett., vol. 29, no. 15, pp. 1739-1741 (2004), if holes in a holey fiber are arranged in a triangular lattice shape, theoretically all wavelengths are transmitted in single-mode when d/$\Lambda$ is less than 0.43. The characteristic that enable single-mode transmission at all wavelengths is called Endlessly Single Modes (ESM). If single-mode transmission is realized in this manner, then much faster optical transmission is possible. At the same time, a coupling of a light with a higher-order mode of the holey fiber can be prevented when the light is inputted into the holey fiber through another optical fiber and alike, which are connected to the holey fiber, thus preventing an increase of a connection loss. Even if d/$\Lambda$ is approximately 0.5 as shown in Ieda et al., if the length of the optical fiber is, for example, longer than 1 km, then higher-order-modes are attenuated during transmission, and therefore the optical fiber effectively achieves ESM characteristics.

As a type of the holey fiber, a multi-core holey fiber having a plurality of cores arranged separately from each other is disclosed (see PCT WO 2006/100488). Because this multi-core holey fiber can transmit a different optical signal through each of the cores, for example, it is considered to enable an ultra-high capacity transmission by way of a space division multiplexing (SDM) transmission.

However, multi-core holey fibers experience crosstalk deterioration between optical signals because interference among optical signals in a plurality of cores causes some portion of the transmitted optical signal in one core to leak into another core(s).

SUMMARY OF THE INVENTION

It is an object of the present invention to at least partially solve the problems in the conventional technology.

According to one aspect of the present invention, there is provided a multi-core holey fiber including a plurality of cores arranged separately from each other; and a cladding surrounding the plurality of cores, wherein the cladding has plurality of holes arranged in a triangular lattice shape to create hole layers around the plurality of cores, and wherein: a ratio d/$\Lambda$ is not more than 0.5, where $\Lambda$ [μm] is lattice constant of the triangular lattice, d [μm] is diameter of each of the holes; a distance between adjacent cores is equivalent to not less than six hole layers; the core arranged farthest from the center of the multi-core holey fiber is surrounded by not less than three hole layers; and the sum of coupling coefficients between the adjacent cores is not more than $1.6 \times 10^{-5}$/m. Furthermore, according to another aspect of the present invention, there is provided an optical transmission system including an optical transmission unit, which outputs at least one optical signal having a wavelength included in a used transmission wavelength band; an optical multiplexing unit that multiplexes optical signals output from the optical transmitting unit; a multi-core holey fiber including: a plurality of cores arranged separately from each other; and a cladding surrounding the plurality of cores, wherein the cladding has plurality of holes arranged in a triangular lattice shape and to create hole layers around the plurality of cores; wherein a ratio d/$\Lambda$ is less than 0.5, where $\Lambda$ [μm] is lattice constant of the triangular lattice, d [μm] is diameter of each of the holes; a distance between adjacent cores is equivalent to not less than six hole layers; the core arranged farthest from the center of the multi-core holey fiber is surrounded by not less three hole layers; and the sum of coupling coefficients between the adjacent cores is not more than $1.6 \times 10^{-5}$/m; an optical demultiplexing unit that demultiplexes the optical signals transmitted through the multi-core holey fiber; and an optical receiving unit that receives the optical signals demultiplexed by the optical demultiplexing unit; wherein the length of the multi-core holey fiber is not more than 1/100 of an effective coupling length based on the sum of coupling coefficients.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

Referring now to the drawings:

FIG. 7 shows calculation examples 1~13;

FIG. 9 shows calculation examples 14~26;

FIG. 10 shows calculation examples 27~39;

FIG. 11 shows calculation examples 40~52;

FIG. 12 shows calculation examples 53~65;

FIG. 13 shows calculation examples 66~78;

FIG. 14 shows calculation examples 79~91;

FIG. 15 shows calculation examples 92~104;

FIG. 16 shows calculation examples 105~117;

FIG. 17 shows calculation examples 118~130;

Figure 18:
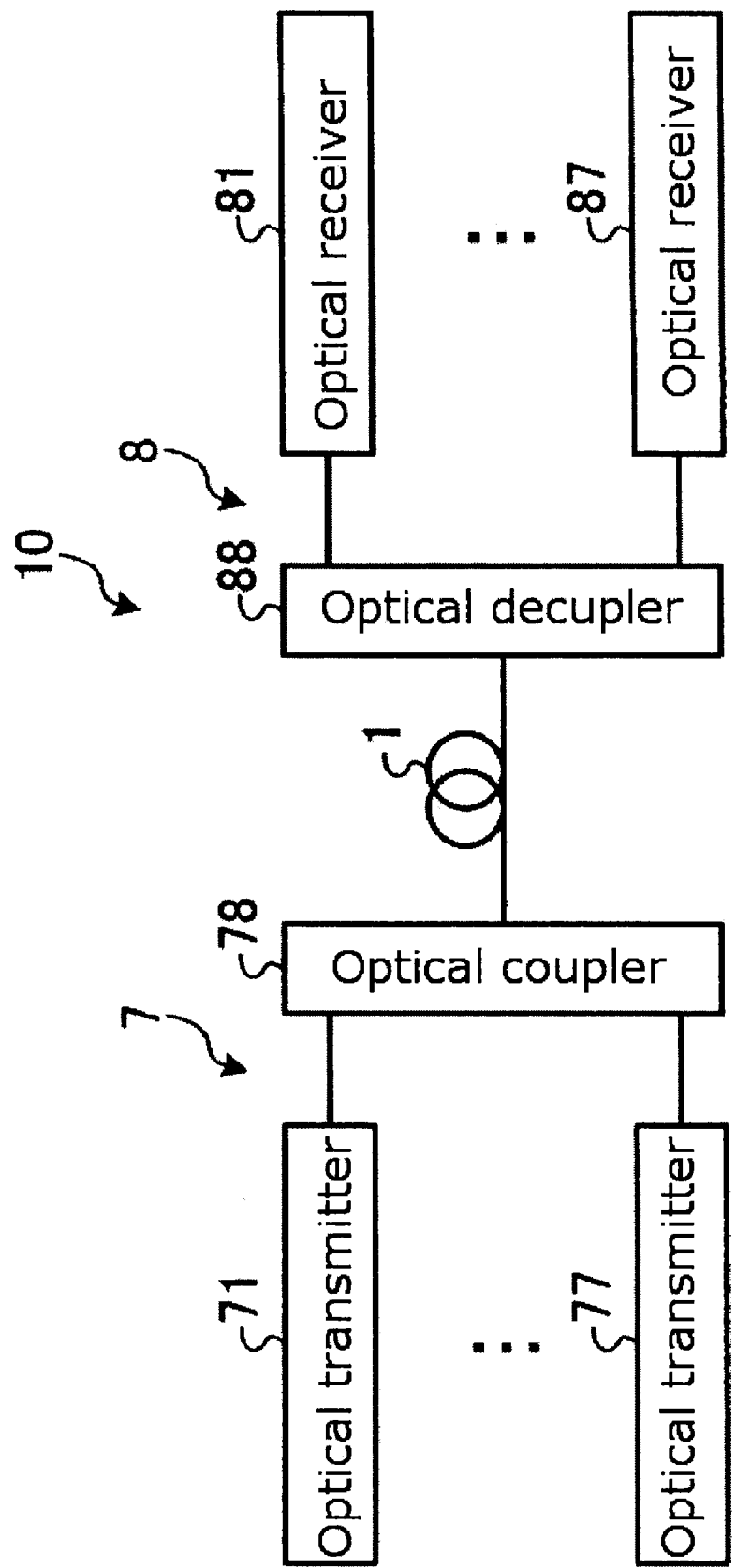
Figure 19:
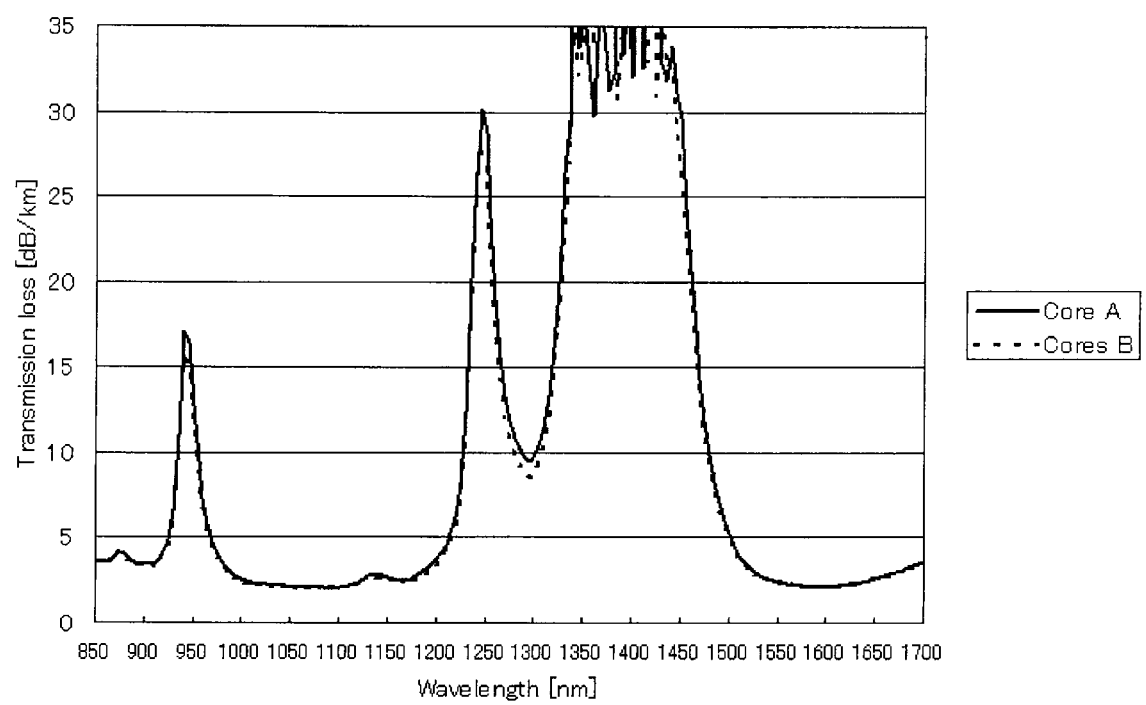
Figure 20:
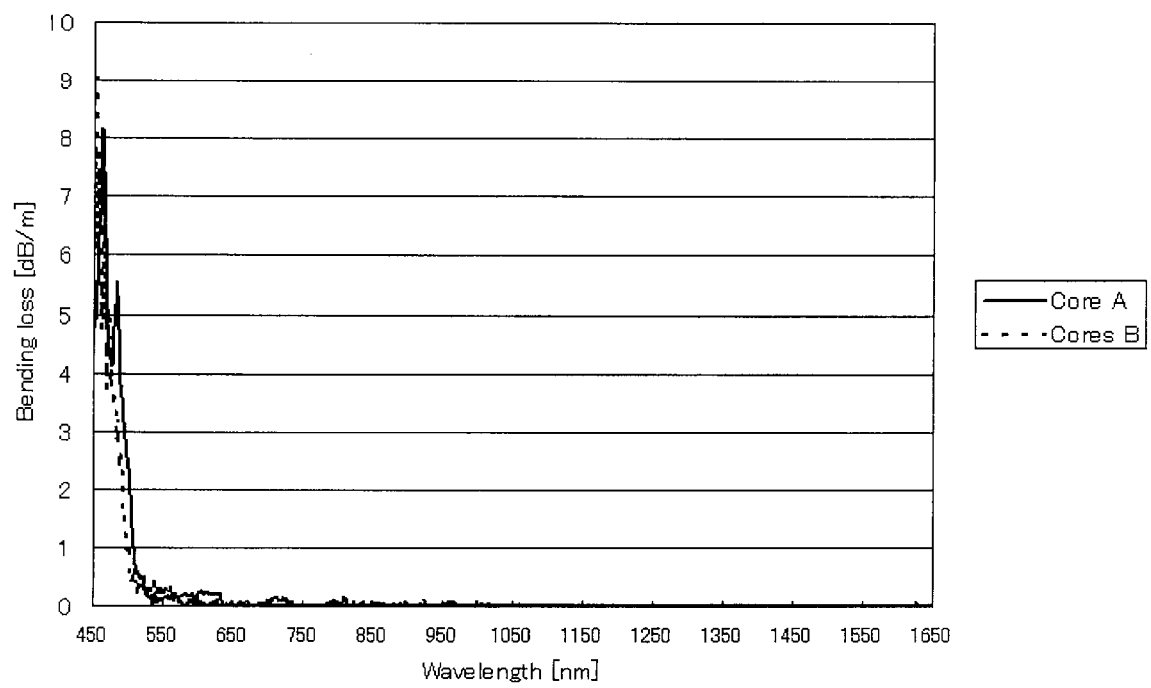

The FIG. 18 shows a block diagram of an optical communication system, which relates to a seventh embodiment of the present invention;

FIG. 19 is a graph, which shows the relationship between the wavelength of a manufactured multi-core HF and transmission loss; and FIG. 20 is a graph, which shows the relationship between the wavelength of the manufactured multi-core HF and bending loss.

DETAIL DESCRIPTION

In the following, a detailed description of embodiments of optical fibers and optical communication systems according to the present invention is set forth by referencing the above-mentioned figures. While various embodiments of the present invention are presented below, it should be understood that they are presented by way of example, and are not intend to limit the scope of the present invention. Also, as disclosed below, multi-core holey fiber is designated multi-core HF. In this specification, "bending loss" is defined as a loss accrued when an optical fiber is wound at a diameter of 20 millimeters. The terms not especially defined herein shall follow the definitions and the measurement methods defined in the International Telecommunication Union Telecommunication Standardization Sector (ITU-T) G.650.1.

First Embodiment of the Present Invention

Figure 1:
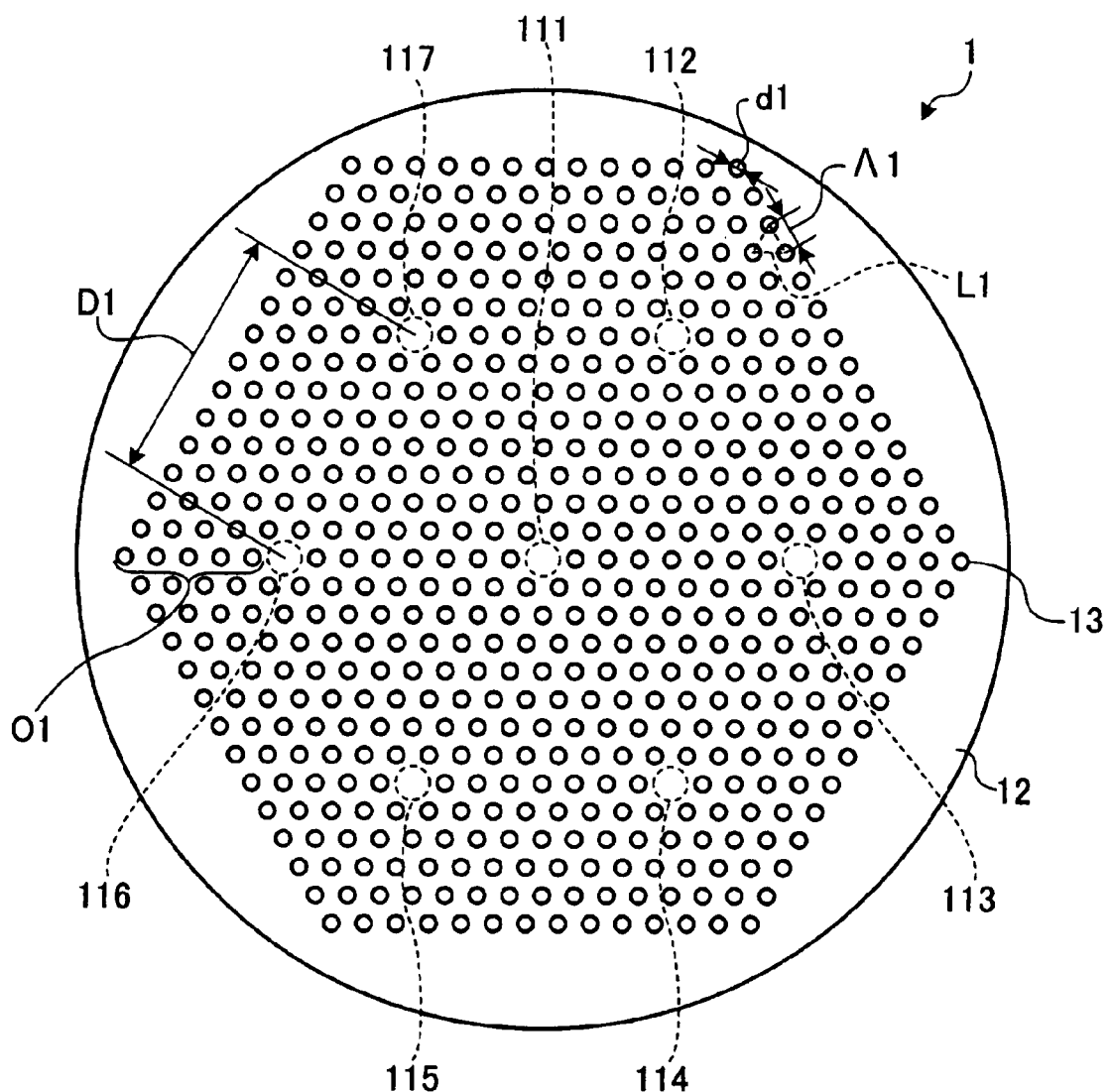
FIG. 1 shows a schematic cross-sectional drawing of a multi-core holey fiber (HF) related to a first embodiment of the present invention.

FIG. 1 shows a schematic cross-sectional drawing of a multi-core HF related to a first embodiment of the present invention. As shown in FIG. 1, the multi-core HF comprises seven cores 111~1117 arranged separately from each other and a cladding 12 that surrounds the cores 111~117. The core 111 is positioned approximately at the center of the fiber and the other cores 112~117 are positioned at apexes of a regular hexagon with the core 111 as the center. Also, the cladding 12 has a plurality of the holes 13 positioned periodically around the cores 111~117. The holes 13 are positioned to form triangular-shaped lattices, L1, and to shape layers of regular hexagons to surround cores 111~117. The cores 111~117 and the cladding 12 are made from pure silica glass, which does not include any refractive index control dopants.

If the diameters, d1, of the holes 13 are d [μm] and a lattice constant, $\Lambda_1$, of the triangular lattice, L1, the distance between the closest holes 13, is $\Lambda$ [μm], then $\Lambda$ is 6 μm and d/$\Lambda$ is 0.43. Also, with respect to the cores arranged farthest from the center of the multi-core HF 1 (i.e., cores 112~117), hole layers surrounding each of the cores 112~117 outward are designated as the outermost layers. For example, as shown in FIG. 1, for the core 116, symbol O1 is the outermost layer. In the multi-core HF 1, the outermost layers have five layers. More specifically, each of the cores 111~117 is surrounded by at least five hole layers. Therefore, confinement loss of each core 111~117 is less than 0.01 dB/km.

Also, core interval (i.e., the distance between cores) is measured between the centers of each core 111~117. For example, as shown in FIG. 1, the core interval between core 116 and core 117 is shown as core interval D1. As shown in FIG. 1, the core interval D1 is equivalent to eight hole layers. Furthermore, in the multi-core HF 1, the core intervals between one of the cores 111~117 and adjacent cores are equivalent to eight hole layers.

Because the multi-core HF 1 has $\Lambda$ of 6 μm and d/$\Lambda$ of 0.43, it achieves ESM characteristics. In addition, because the multi-core HF1 separates any of the cores 111~117 by core intervals of more than eight hole layers, the sum of coupling coefficients between adjacent cores is less than $1.6 \times 10^{-5}$/m in each of the cores 111~117. As a result, when the length of the multi-core HF 1 is longer than 1 km, crosstalk of the transmitted optical signals in each of the cores 111~117 is suppressed to less than −35 dB. Details are explained below.

First, transmitted light in two adjacent cores of the multi-core HF 1 are considered. Optical interference between cores in this parallel, two-core waveguide structure is expressed using coupled-mode theory. More specifically, optical power, P, is transferred from one core to the other due to mode coupling during transmission and can be calculated as $P = \sin^2(Xz)$. Where z is the transmission distance and X is a mode-coupling coefficient. Therefore, when $z = p/(2\times)$, P=1 which means that 100% of the optical power is transferred from one core to the other. The transmission distance, which transfers 100% of the optical power, is called coupling length L, where $L = p/(2\times)$.

If the length of the multi-core HF 1 is 1/100 of the coupling length, then $P = \sin^2(p/200) = 0.000247$, and the optical power transferred from one core to the other core is less than 0.03%. Therefore, crosstalk between the cores is less than −35 dB, which is sufficiently small.

Therefore, in the multi-core HF 1, if the coupling coefficients of the adjacent cores are less than $1.6 \times 10^{-5}$/m, and the coupling length is longer than 100 km, and the length of the multi-core HF is longer than 1 km, then the crosstalk between the cores is less than −35 dB.

As stated above, the coupling length is based on the coupling coefficient. The coupling coefficient can be adjusted by controlling the overlapping of optical mode fields transmitted in the cores by designing $\Lambda$, d/$\Lambda$ and the core interval of any two cores in the multi-core HF.

Next, all of the cores 111~117 in the multi-core HF1 are considered. In this case, to determine the crosstalk within one core, the contribution of mode coupling from all other cores must be considered. The coupling coefficient of any of the cores from the sum of any other cores must be less than $1.6\times10^{-5}$/m. If the sum of the coupling coefficient $x_s$ is less than $1.6\times10^{-5}$/m and the effective corresponding coupling length $L_{eff}$ is $p/(2x_s)$, then the effective corresponding coupling length $L_{eff}$ is longer than 100 km. As a result, when the length of the multi-core HF 1 is longer than 1 km, the crosstalk of the transmitted optical signal in each of the cores 111~117 is suppressed to less than −35 dB.

The coupling coefficient decreases rapidly as core intervals between the cores increases, and therefore the sum of the coupling coefficients is approximately the same as the sum of the coupling coefficient between the closest adjacent cores. In the multi-core HF 1, for example, the sum of the coupling coefficients between the core 111 and the other cores 112~117 can be calculated from the sum of the coupling coefficients between the core 111, and the other cores 112~117; and the sum of the coupling coefficients between the core 117 and the other cores 111~116 can be calculated from the sum of the coupling coefficients between the core 117 and other cores 111, 112 and 116.

As explained above, the multi-core HF 1 related to the first embodiment of the present invention suppresses the crosstalk deterioration of the optical signal transmitted in each of the cores.

The diameter of the multi-core HF 1 is preferably set to cover 1.1 times the area needed to be covered by the holes 13, for manufacturability.

Second Embodiment of the Present Invention

Figure 2:
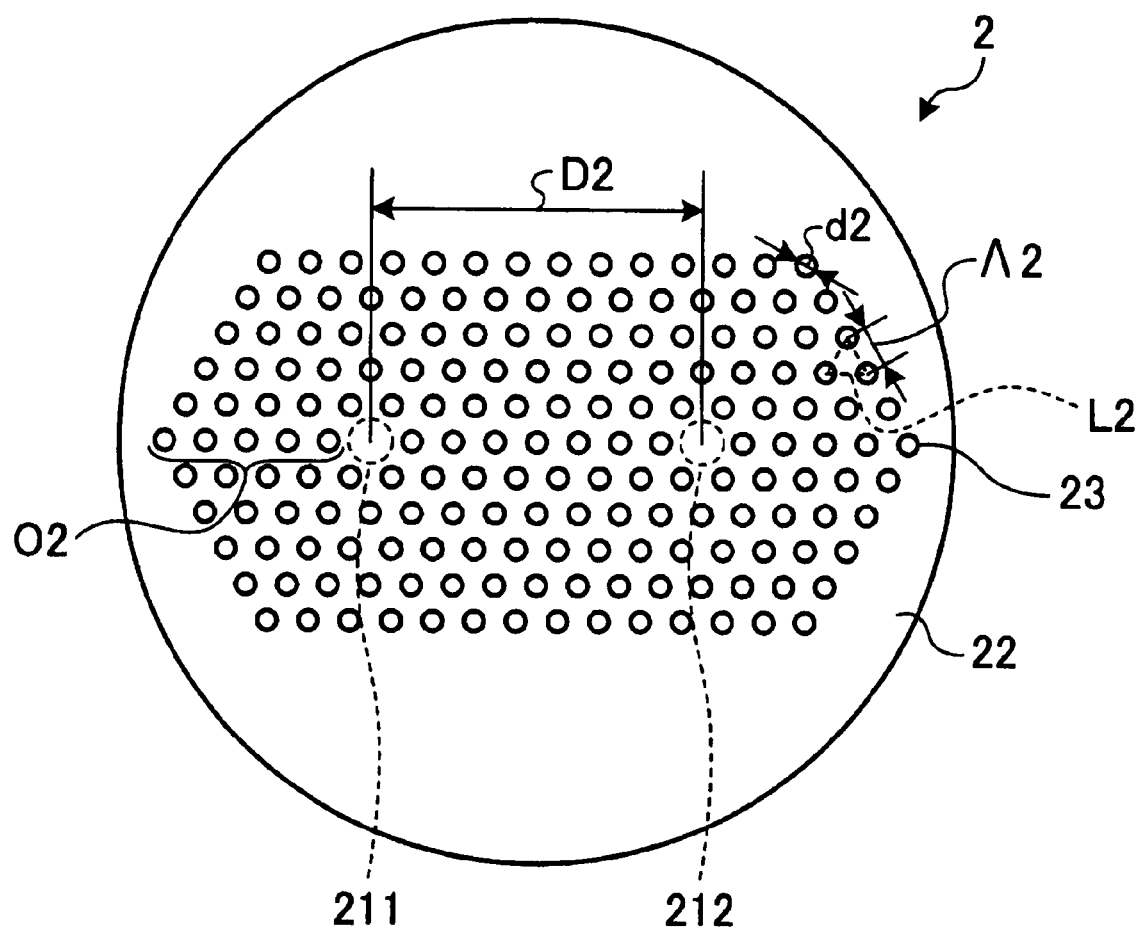
FIG. 2 shows a schematic cross-sectional drawing of a multi-core HF related to a second embodiment of the present invention.

Below, a second embodiment of the present invention is disclosed. FIG. 2 shows a schematic cross-sectional drawing of a multi-core HF related to the second embodiment of the present invention. As shown in FIG. 2, the multi-core HF 2 comprises two cores 211, 212 arranged separately from each other and a cladding 22 positioned to surround the cores 211, 212. The cores 211, 212 are positioned approximately symmetric to each other with respect to the center of the multi-core HF 2. Also, the cladding 22 has a plurality of holes 23 positioned periodically around the cores 211, 212. The holes 23 are positioned to form triangular lattices L2 and to form layers of hexagons that surround the cores 211, 212. The cores 211, 212 and the cladding 22 are made from the pure silica glass.

If the diameters, d2, of the holes 23 are d [μm] and a lattice constant A2 of the triangular lattice, L2, is Λ [μm], then Λ is 6 μm and d/Λ is 0.43. Also, for the core 211, the outermost layers O2 comprise five hole layers, which is the same for core 212. Therefore, confinement loss of each of the cores 211, 212 is less than 0.01 dB/km.

The core interval, D2, between the cores 211 and 212 has the equivalent of eight hole layers. As a result, similar to the first embodiment, when the length of the multi-core HF 2 is longer than 1 km, then crosstalk of the transmitted optical signal in each of the cores 211, 212 is suppressed to less than −35 dB.

Third Embodiment of the Present Invention

Figure 3:
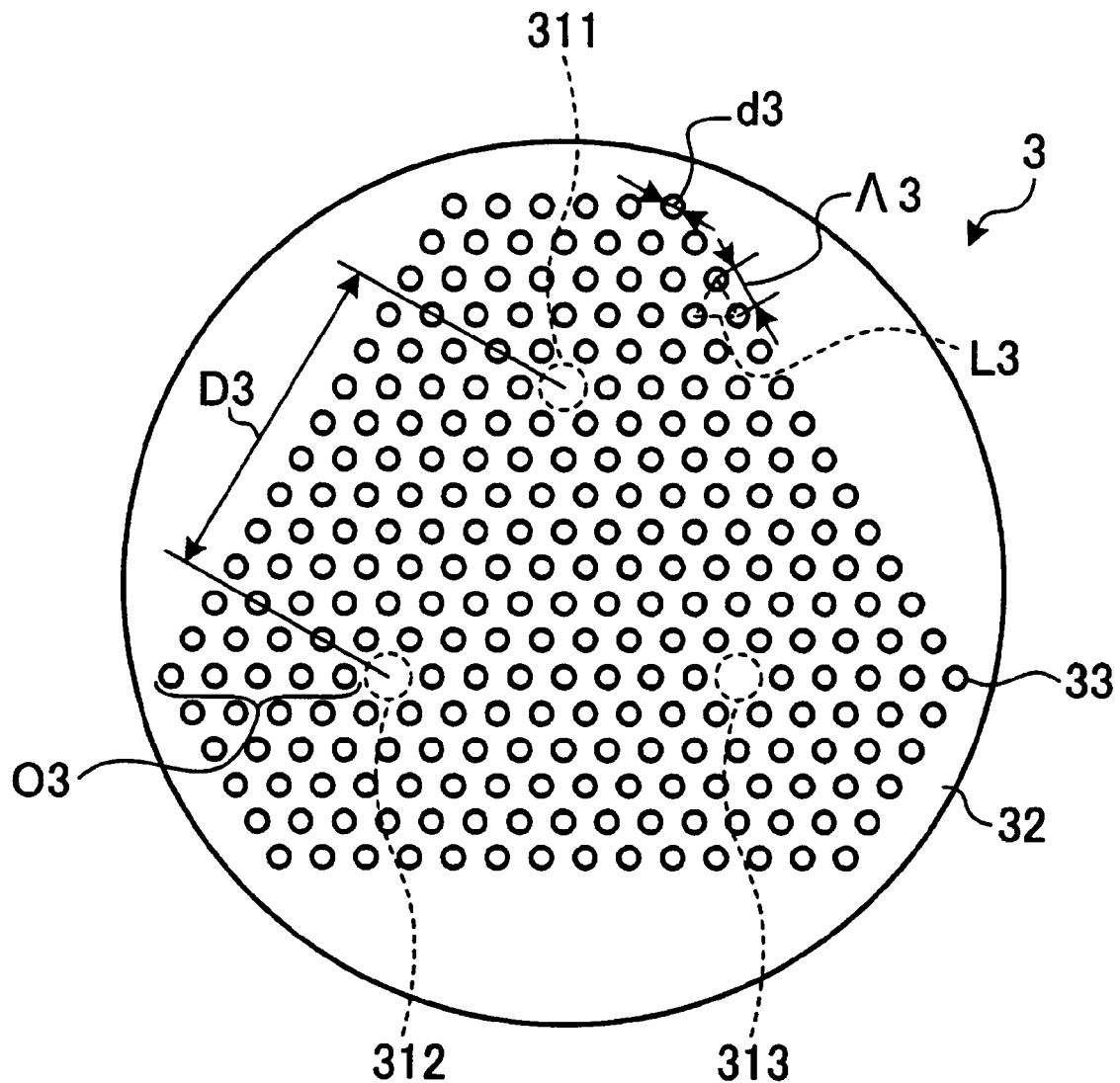
FIG. 3 shows a schematic cross-sectional drawing of a multi-core HF related to a third embodiment of the present invention.

Below, a third embodiment of the present invention is disclosed. FIG. 3 shows a schematic cross-sectional drawing of a multi-core HF related to the third embodiment of the present invention. As shown in FIG. 3, the multi-core HF 3 comprises three cores 311~313 arranged separately from each other and a cladding 32 surrounds the cores 311~313.

The cores 311~313 are positioned at the apexes of a regular triangle, which has a center at the center of the multi-core HF 3. Also, the cladding 32 has a plurality of holes 33 positioned periodically around the cores 311~313. The holes 33 are positioned to form triangular lattices L3 and to form layers of hexagons that surround the cores 311~313. The cores 311~313 and the cladding 32 are made from pure silica glass.

If the diameters, d3, of the holes 33 are d [μm] and a lattice constant, Λ3, of the triangular lattice 3 is Λ [μm], then Λ is 6 μm and d/Λ is 0.43. Also, for the core 312, the outermost layers O3 comprise five hole layers, which is the same for cores 311, 313. Therefore, confinement loss of each of the cores 311~313 is less than 0.01 dB/km.

The core interval D2 between core 311 and core 312 is equivalent to eight hole layers, and it is the same for the core interval between core 312 and core 313. As a result, similar to the first embodiment, when the length of the multi-core HF 3 is longer than 1 km, then crosstalk of the transmitted optical signal in each of the cores 311~313 is suppressed to less than −35 dB.

Fourth Embodiment of the Present Invention

Figure 4:
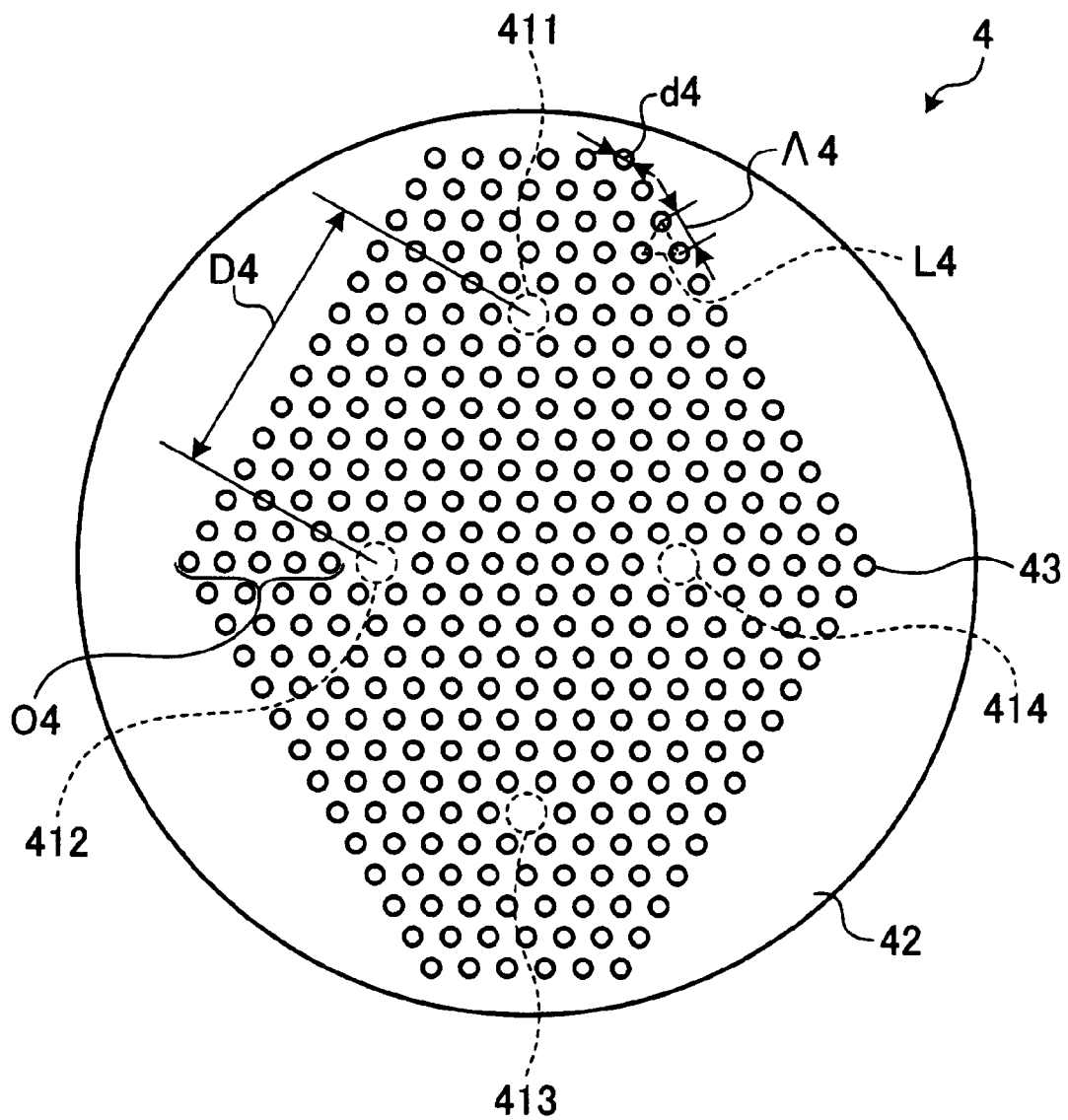
FIG. 4 shows a schematic cross-sectional drawing of a multi-core HF related to a forth embodiment of the present invention.

Below, a fourth embodiment of the present invention is disclosed. FIG. 4 shows a schematic cross-sectional drawing of a multi-core HF related to the fourth embodiment of the present invention. As shown in FIG. 4, the multi-core HF 4 comprises four cores 411~414 arranged separately from each other and a cladding 42 surrounding the cores 411~414. The cores 411~414 are positioned at the apexes of a lozenge, which has a center at the center of the multi-core HF 4. Also, the cladding 42 has a plurality of holes 43 positioned periodically around the cores 411~414. The holes 43 are positioned to form triangular lattices, L4, and to form layers of hexagons that surround the cores 411~414. The cores 411~414 and the cladding 42 are made from pure silica glass.

If the diameters, d4, of the holes 43 are d [μm] and a lattice constant, Λ4, of the triangular lattice 4 is Λ [μm], then Λ is 6 μm and d/Λ is 0.43. Also, for the core 412, the outermost layers O4 comprise five hole layers, which is the same for the cores 411, 413, 414. Therefore, confinement loss of each cores 411~414 is less than 0.01 dB/km.

The core interval, D4, between the core 411 and the core 412 is equivalent to eight hole layers, and it is the same for any of the core intervals between one of the cores 411~414 and the adjacent cores. As a result, similar to the first embodiment, when the length of the multi-core HF 4 is longer than 1 km, the crosstalk of the transmitted optical signal in each of the cores 411~413 is suppressed to less than −35 dB.

Fifth Embodiment of the Present Invention

Figure 5:
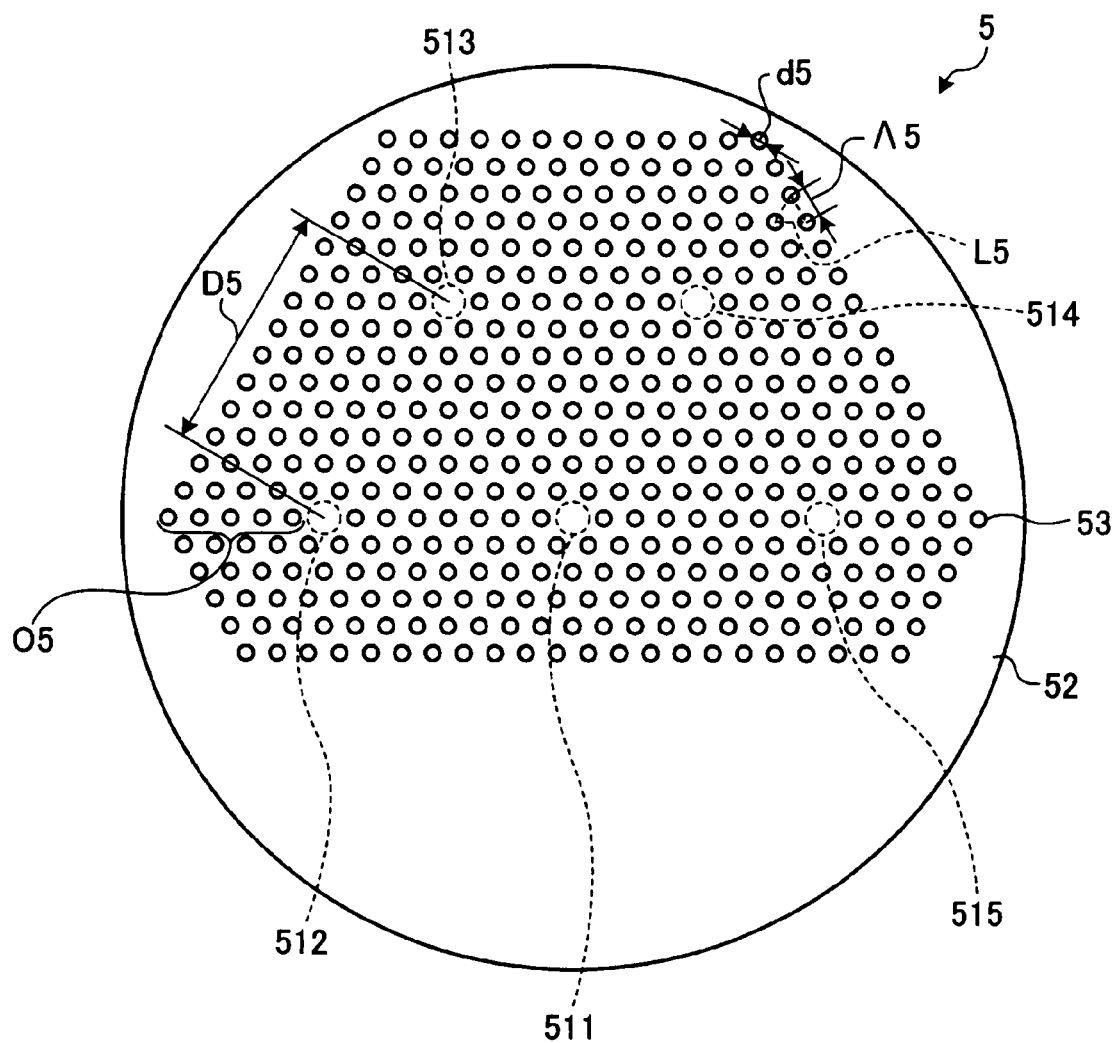
FIG. 5 shows a schematic cross-sectional drawing of a multi-core HF related to a fifth embodiment of the present invention.

Below, a fifth embodiment of the present invention is disclosed. FIG. 5 shows a schematic cross-sectional drawing of a multi-core HF related to the fifth embodiment of the present invention. As shown in FIG. 5, the multi-core HF 5 comprises five cores 511~515 arranged separately from each other and a cladding 52 positioned surrounded the cores 511~515. The core 511 is positioned approximately at the center of the multi-core HF 5 and each of the other cores 512~515 is positioned at the apexes of a regular hexagon with the core 511 centered, except the two adjacent apexes out of the five apexes as shown in FIG. 5. Also, cladding 52 has a plurality of holes 53 positioned periodically around cores 511~515. The holes 53 are positioned to form triangular-shaped lattices, L5, and to form layers of hexagons that surround the cores 511~515. The cores 511~515 and the cladding 52 are made from pure silica glass.

If the diameters, d5, of the holes 53 are d [μm] and a lattice constant, Λ5, of the triangular lattice, L5, is Λ [μm], then Λ is 6 μm and d/Λ is 0.43. Also, for the core 512, the outermost layers O5 comprise five hole layers, which is the same for cores 511, 513~515. Therefore, confinement loss of each of the cores 511~515 is less than 0.01 dB/km.

The core interval D5 between the core 512 and the core 513 is equivalent to eight hole layers, and it is the same for any of the core intervals between one of the cores 511~515 and the adjacent cores. As a result, similar to the first embodiment, when the length of the multi-core HF 5 is longer than 1 km, the crosstalk of the transmitted optical signal in each of the cores 511~515 is suppressed to less than −35 dB.

Sixth Embodiment of the Present Invention

Figure 6:
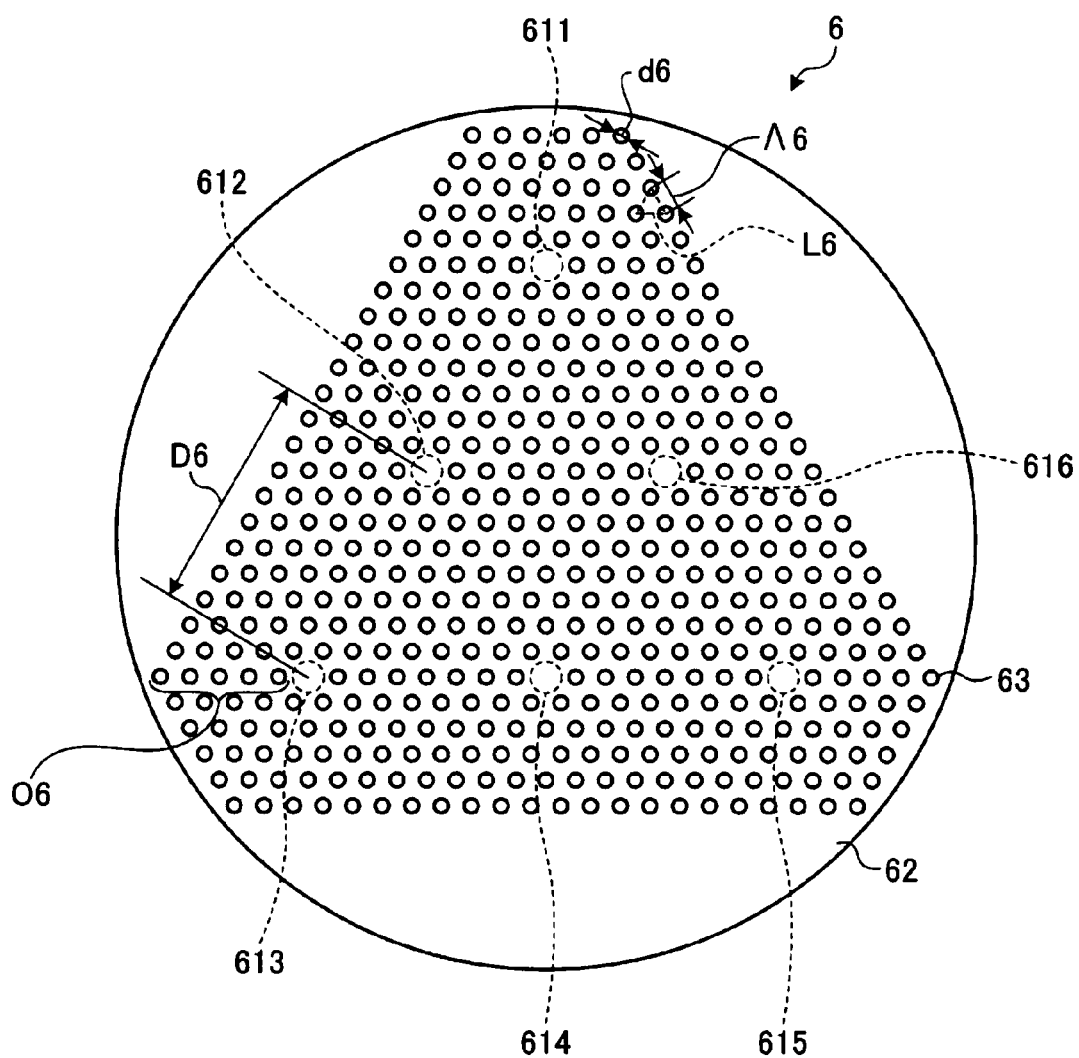
FIG. 6 shows a schematic cross-sectional drawing of a multi-core HF related to a sixth embodiment of the present invention.

Below, a sixth embodiment of the present invention is disclosed. FIG. 6 shows a schematic cross-sectional drawing of a multi-core HF related to the sixth embodiment of the present invention. As shown in FIG. 6, the multi-core HF 6 comprises six cores 611~616 arranged separately from each other, and a cladding 62 surrounding the cores 611~616. The cores 611~616 are positioned at the apexes and middle of sides of a regular triangle, which has a center at the center of the multi-core HF 6. Also, the cladding 62 has a plurality of holes 63 positioned periodically around the cores 611~616. The holes 63 are positioned to form triangular-shaped lattices L6 and to form layers of hexagons that surround the cores 611~616. The cores 611~616 and the cladding 62 are made from pure silica glass.

If the diameters, d6, of the holes 63 are d [μm] and a lattice constant, Λ6, of the triangular lattice, L6, is Λ [μm], then Λ is 6 μm and d/Λ is 0.43. Also, for the core 613, the outermost layers O6, comprise five hole layers, which is the same for the cores 611, 612, 614~616. Therefore, confinement loss of each of the cores 611~616 is less than 0.01 dB/km.

The core interval, D6, between the core 612 and the core 613 is equivalent to eight hole layers, and it is the same for any of the core intervals between one of the cores 611~616 and the adjacent cores. As a result, similar to the first embodiment, when the length of the multi-core HF 6 is longer than 1 km, the crosstalk of the transmitted optical signal in each of the core 511~515 is suppressed to less than −35 dB. The diameters of the multi-core HF 2~6 in the above second to sixth embodiments are preferably set to cover 1.1 times the area needed to be covered by the holes 13~63, for manufacturability.

CALCULATION EXAMPLES

The multi-core HF of the present invention is not limited to the above first to sixth embodiments, and parameters such as Λ, d/Λ, core interval between the cores, and outermost layers can be adjusted accordingly. Below, the present invention is explained even further using calculation examples 1~13.

Examples 1~13

FIG. 7 shows calculation examples 1~13, which calculate outermost layers of a multi-core HF having structure that is similar to the first to sixth embodiments. In the examples, the outermost layers are calculated using d/Λ=0.5, a specific core interval to make a coupled length of 100 km, and a confinement loss that is less than 0.01 dB/km. The calculation is done by using Finite Element Method (FEM) simulation. Also, the coupling length, shown in FIG. 7 in which the multi-core HF has more than three cores, means actual coupling length. Core interval in FIG. 7 is the core interval between cores. Also, for example, "2-core" means a multi-core HF with two cores. "$A_{eff}$@1550 nm" is the effective core 1 area at the wavelength of 1550 nm. "Fiber diameter" is the diameter of each multi-core HF. The diameter of each multi-core HF is selected to cover 1.1 times the area that needs to be covered by holes based on manufacturability. Also, in FIG. 7, as a comparison, the diameter of a single-core HF is shown as "1-core". "Wavelength $\lambda_1$ when bending loss becomes 10 dB/m" is explained latter.

As shown in FIG. 7, the multi-core HF related to the calculation examples has confinement loss of less than 0.01 dB/km over a coupling length of 100 km because the outermost layers and core intervals among the cores are adjusted accordingly. Also, since d/Λ is 0.5, it practically achieves ESM characteristics Next, in FIG. 7, a wavelength $\lambda_1$, which creates 10 dB/m bending loss is explained. This wavelength $\lambda_1$ in the multi-core HF related to the calculation examples is a shortest wavelength which creates less than 10 dB/m bending loss. Therefore, the multi-core HF related to the calculation examples 1~13 experience 10 dB/m or greater bending loss when wavelength is shorter than the wavelength $\lambda_1$. In general, conventional transmission optical fibers require the bending loss to be less than 10 dB/m, and it is preferable to use the multi-core HF related to the calculation examples 1~13 above the wavelength $\lambda_1$.

Figure 8:
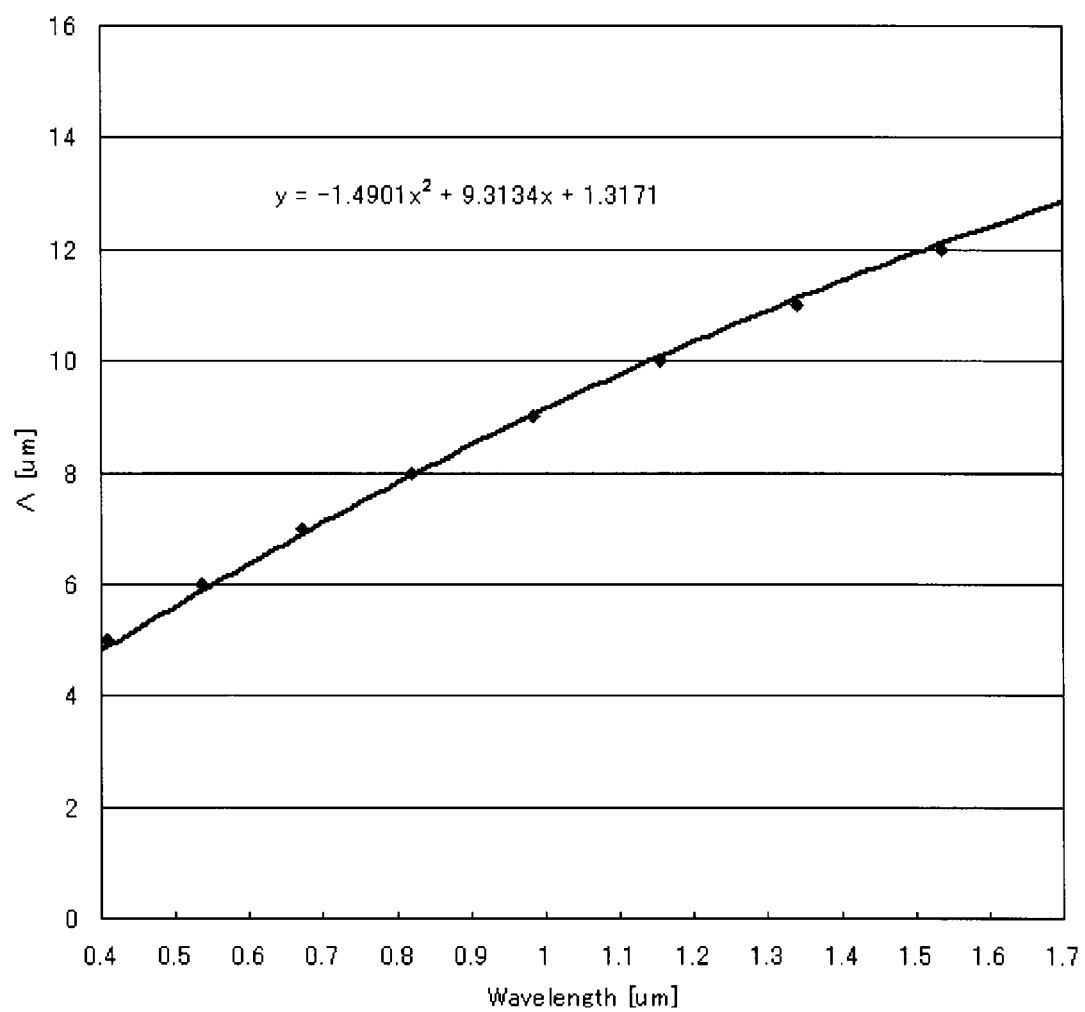
FIG. 8 is a graph, which shows the relationship between wavelength $\lambda_1$ and $\Lambda$.

FIG. 8 is a graph that shows the relationship between the wavelength $\lambda_1$ and Λ in FIG. 7. Also, curve C is an approximated curve, which is expressed as $\Lambda = -0.14901\lambda_1^2 + 9.3134\lambda_1 + 1.3171$. Therefore, the multi-core HF related to the calculation examples 1~13 preferably use wavelengths that satisfy the equation $\Lambda = -0.14901\lambda_1^2 + 9.3134\lambda_1 + 1.3171$. Also, if Λ is less than 12 μm, the bending loss at the wavelength of 1550 nm, the most commonly used wavelength for optical transmission systems, is less than 10 dB/m.

Examples 14~26

FIG. 9 shows calculation examples 14~26, which have structures similar to the first to sixth embodiments using d/Λ=0.5. In these examples, the outermost layers are calculated to make a confinement loss that is less than 0.01 dB/km; and the core intervals are also calculated to make a coupled length of 1000 km. As shown in FIG. 9, the multi-core HF related to the calculation examples has a confinement loss that is less than 0.01 dB/km over a coupling length of 10000 km, and practically achieves ESM characteristics because the outermost layers and core intervals among the cores are adjusted accordingly. Also, multi-core HF with a coupling length of 10000 km can keep the crosstalk between the cores within −35 dB even if the length is set to be 100 km.

Examples 27~39

FIG. 10 shows calculation examples 27~39, which have structures similar to the first to sixth embodiments using d/Λ=0.48. In these examples, the outermost layers are calculated to make a confinement loss that is less than 0.01 dB/km; and the core intervals are also calculated to make a coupled length of 100 km. As shown in FIG. 10, the multi-core HF related to the calculation examples has a confinement loss that is less than 0.01 dB/km over a coupling length of 100 km, and practically achieves ESM characteristics because the outermost layer and core intervals among the cores are adjusted accordingly.

Examples 40~52

FIG. 11 shows calculation examples 40~52, which have structures similar to the first to sixth embodiments using d/Λ=0.48. In these examples, the outermost layers are calculated to make a confinement loss that is less than 0.01 dB/km; and the core intervals are also calculated to make a coupled length of 10000 km. As shown in FIG. 11, the multi-core HF related to the calculation examples 40~52 has a confinement loss that is less than 0.01 dB/km over a coupling length of 10000 km and practically achieves ESM characteristics because the outermost layers and core intervals among the cores are adjusted accordingly.

Examples 53~65

FIG. 12 shows calculation examples 53~65, which have structures similar to the first to sixth embodiments using d/Λ=0.45. In these examples, the outermost layers are calculated to make a confinement loss that is less than 0.01 dB/km; and the core intervals are also calculated to make a coupled length of 100 km. As shown in FIG. 12, the multi-core HF related to the calculation examples 53~65 has a confinement loss that is less than 0.01 dB/km over a coupling length of 100 km and practically achieves ESM characteristics because the outermost layers and core intervals among the cores are adjusted accordingly.

Examples 66~78

FIG. 13 shows calculation examples 66~78, which have structures similar to the first to sixth embodiments using d/Λ=0.45. In these examples, the outermost layers are calculated to make a confinement loss that is less than 0.01 dB/km; and the core intervals are also calculated to make a coupled length of 10000 km. As shown in FIG. 13, the multi-core HF related to the calculation examples 66~78 has a confinement loss that is less than 0.01 dB/km over coupling length of 10000 km and practically achieves ESM characteristics because the outermost layers and core intervals among the cores are adjusted accordingly.

Examples 79~91

FIG. 14 shows calculation examples 79~91, which have structures similar to the first to sixth embodiments using d/Λ=0.43. In these examples, the outermost layers are calculated to make a confinement loss that is less than 0.01 dB/km; and the core intervals are also calculated to make a coupled length of 100 km. As shown in FIG. 14, the multi-core HF related to the calculation examples has confinement loss of less than 0.01 dB/km over a coupling length of 100 km because the outermost layers and core intervals among the cores are adjusted accordingly, and practically achieves ESM characteristics because d/Λ=0.43. Also, if Λ is less than 10 μm, then bending loss at 1550 nm is less than 10 dB/m.

Examples 92~104

FIG. 15 shows calculation examples 92~104, which have structures similar to the first to sixth embodiments using d/Λ=0.43. In these examples, the outermost layers are calculated to make a confinement loss that is less than 0.01 dB/km; and the core intervals are also calculated to make a coupled length of 10000 km. As shown in FIG. 15, the multi-core HF related to the calculation examples 92~104 has confinement loss of less than 0.01 dB/km over a coupling length of 10000 km and practically achieves ESM characteristics because the outermost layers and core intervals among the cores are adjusted accordingly.

Examples 105~117

FIG. 16 shows calculation examples 105~117, which have structures similar to the first to sixth embodiments using d/Λ=0.40. In these examples, the outermost layers are calculated to make a confinement loss that is less than 0.01 dB/km; and the core intervals are also calculated to make a coupled length of 100 km. As shown in FIG. 16, the multi-core HF related to the calculation examples 105~117 has a confinement loss of less than 0.01 dB/km over a coupling length of 100 km and practically achieves ESM characteristics because the outermost layers and core intervals among the cores are adjusted accordingly.

Examples 118~130

FIG. 17 shows calculation examples 118~130, which have structures similar to the first to sixth embodiments using d/Λ=0.40. In these examples, the outermost layers are calculated to make a confinement loss that is less than 0.01 dB/km; and the core intervals are also calculated to make a coupled length of 10000 km. As shown in FIG. 17, the multi-core HF related to the calculation examples 118~130 has a confinement loss of less than 0.01 dB/km over a coupling length of 10000 km and practically achieves ESM characteristics because the outermost layers and core intervals among the cores are adjusted accordingly.

As shown in above calculation examples 1~130, if d/Λ is 0.5 and core intervals among the cores are more than six layers, then the coupling length can be greater than 100 km, and if core intervals among the cores are more than seven layers, then the coupling length can be greater than 1000 km. Also, if d/Λ is 0.43 and core intervals among the cores are more than seven layers, then the coupling length can be greater than 100 km, and if core intervals among the cores are more than eight layers, then the coupling length can be greater than 1000 km.

Seventh Embodiment of the Present Invention

Next, optical transmission system, which is related to the seventh embodiment of the present invention, is explained. FIG. 18 shows a block diagram of an optical communication system, which relates to the seventh embodiment. As shown in FIG. 18, the optical transmission system 10 includes: an optical transmission apparatus 7; a multi-core HF 1 related to the first embodiment connected to the optical transmission apparatus 7; and an optical receiving apparatus 8 connected to the multi-core HF 1. The optical transmission apparatus 7 has seven optical transmitters 71~77 that output optical signals at different wavelengths, and an optical multiplexer 78 that multiplexes optical signals output from the optical transmitters 71~77 and outputs the multiplexed signal to the multi-core HF 1. The optical receiving apparatus 8 has an optical demultiplxer 88 that demultiplexes the optical signals transmitted through the multi-core HF 1, and optical receivers 81~87 that receives the optical signals demultiplexed by the optical demultiplexer.

The optical signals output from the optical transmitters 71~77 are, for example, laser light modulated by a Non-Return-to-Zero (NRZ) signal having a modulation rate of 10 Gbps. Wavelengths of the optical signals are 0.85 μm, 0.98 μm, 1.05 μm, 1.31 μm, 1.48 μm, 1.53 μm and 1.55 μm. These wavelengths are distributed in a broad wavelength bandwidth having a center thereof at approximately 1 μm. Also, those wavelengths are within the wavelength range where the multi-core HF 1 experiences less than 10 dB/m of bending loss.

Also, the optical multiplexer 78 multiples optical signals output from each of the optical transmitters 71~77 and outputs the multiplexed signal to each of the cores 111~117 in the multi-core HF 1. Accordingly, each of the optical signals from the optical transmitters 71~77 propagate in different cores 111~117 from each other. On the other hand, the optical demultiplexer 88 demultiples the transmitted optical signals from the different cores 111~117 of the multi-core HF 1 and guides them to respective optical receivers 81~87. The optical receivers 81~87 extract the NRZ signal from each of the optical signals as an electrical signal.

The optical multiplexer 78, for example, has seven standard single-mode fibers on the input side and one multi-core HF1 on the output side, and can be made from waveguide-type, fiber-fusion-type or space-coupling-type optical multiplexer such as an Arrayed WaveGuide (AWG). Also, the same structure element for the optical multiplexer 78 can be used for the optical demultiplexer 88.

Here, the length of the multi-core HF 1 is 1 km (1/100 of the 100 km effective coupling length). As a result, according to the optical transmission system 10, the crosstalk between the transmitted optical signals is suppressed and SDM transmission is possible.

Next, as an embodiment of the present invention, multi-core HF according to the first embodiment is manufactured. Manufactured multi-core HF has $\Lambda=5$ μm, $d/\Lambda=0.43$, seven cores, ten hole layers of the core intervals between the cores, and five hole layers of the outermost layers. Accordingly, as shown in the calculation example 95 of FIG. 15, it achieves longer than 10000 km of coupling length. Next, in the manufactured multi-core HF, optical characteristics about the center core (core A) and the outer cores (cores B) are measured. As a result, chromatic dispersion at 1550 nm in core A is 41.2 ps/nm/km and in cores B is 40.2 ps/nm/km. Therefore, each of the dispersions is almost the same as the simulation result of 40.0 ps/nm/km. Also, the dispersion slope at 1550 nm in core A is 0.072 ps/nm$^2$/km and in cores B is 0.071 ps/nm$^2$/km. Therefore, each of the dispersion slopes is almost the same as the simulation result of 0.071 ps/nm$^2$/km. Also, the effective core area at 1550 nm in core A is 38.7 μm$^2$ and in cores B is 41.8 μm$^2$. Therefore, each of the effective core area is almost the same as simulation result of 35.5 μm$^2$. FIG. 19 shows the relationship between wavelength of manufactured multi-core HF and transmission loss. As shown in FIG. 19, the transmission loss at 1550 nm in core A is 2.4 dB/km and in cores B is 2.4 dB/km; at 1310 nm the transmission loss in core A is 11.5 dB/km and in cores B is 10.3 dB/km; at 1050 nm the transmission loss in core A is 2.1 dB/km and in cores B is 2.0 dB/km; and at 850 nm the transmission loss in core A is 3.6 dB/km and in cores B is 3.7 dB/km. There are no large differences in the loss, and those losses are not affected by the confinement loss in the longer wavelength region and by the bending loss in the shorter wavelength region. FIG. 20 shows the relationship between wavelength of the manufactured multi-core HF and bending loss. As shown in FIG. 20, the bending loss associated with a 20 mm diameter bend in the wavelength region longer than 500 nm in both core A and cores B is relatively low (i.e., less than 2 dB/m). Also, when interference between core A and core B is measured, the crosstalk at wavelengths of 850 nm, 1050 nm, 1310 nm and 1550 nm is relatively small (i.e., less than 60 dB).

What is claimed is:

1. A multi-core holey fiber comprising:
    a plurality of cores arranged separately from each other; and
    a cladding surrounding the plurality of cores wherein the cladding has a plurality of holes arranged in a triangular lattice shape to create hole layers around each of the plurality of cores; wherein a ratio $d/\Lambda$ is not more than 0.5, where $\Lambda$ [μm] is lattice constant of the triangular lattice, d [μm] is diameter of each of the holes;
    a distance between adjacent cores is equivalent to not less than six hole layers; the core arranged farthest from the center of the multi-core holey fiber is surrounded by not less than three hole layers; and the sum of coupling coefficients between the adjacent cores is not more than $1.6 \times 10^{-5}$/m.

2. The multi-core holey fiber of claim 1, wherein the distance between the adjacent cores is equivalent to not less than seven hole layers.

3. The multi-core holey fiber of claim 2, wherein the distance between the adjacent cores is equivalent to not less than eight hole layers.

4. The multi-core holey fiber of claim 1, wherein $\Lambda$ is not more than 12 μm, and a bending loss is not more than 10 dB/m at a wavelength of 1550 nm in a bending diameter of 20 mm.

5. The multi-core holey fiber of claim 4, wherein $\Lambda$ is not more than 10 μm, and $d/\Lambda$ is not more than 0.43.

6. An optical transmission system comprising:
    an optical transmission unit, which outputs at least one optical signal having a wavelength included in a used transmission wavelength band;
    an optical multiplexing unit that multiplexes optical signals output from the optical transmitting unit;
    a multi-core holey fiber comprising:
        a plurality of cores arranged separately from each other; and
        a cladding surrounding the plurality of cores, wherein the cladding has plurality of holes arranged in a triangular lattice shape and to create hole layers around the plurality of cores;
    wherein a ratio $d/\Lambda$ is less than 0.5, where $\Lambda$ [μm] is lattice constant of the triangular lattice, d [μm] is diameter of each of the holes;
        a distance between adjacent cores is equivalent to not less than six hole layers; the core arranged farthest from the center of the multi-core holey fiber is surrounded by not less three hole layers; and the sum of coupling coefficients between the adjacent cores is not more than $1.6 \times 10^{-5}$/m;
    an optical demultiplexing unit that demultiplexes the optical signals transmitted through the multi-core holey fiber; and
    an optical receiving unit that receives the optical signals demultiplexed by the optical demultiplexing unit;
    wherein the length of the multi-core holey fiber is not more than 1/100 of an effective coupling length based on the sum of coupling coefficients.

7. The optical transmission system of claim 6, wherein the shortest wavelength $\lambda_s$ included in the used transmission wavelength band satisfies the equation:

$$\Lambda = -0.14901\lambda_s^2 + 9.3134\lambda_s + 1.3171.$$

8. The optical transmission system of claim 7, wherein $\lambda_s$ is not longer than 1550 nm.

\* \* \* \* \*

UNITED STATES PATENT AND TRADEMARK OFFICE
CERTIFICATE OF CORRECTION

| | |
|---|---|
| PATENT NO. | : 8,094,985 B2 |
| APPLICATION NO. | : 12/546894 |
| DATED | : January 10, 2012 |
| INVENTOR(S) | : Katsunori Imamura |

Page 1 of 1

It is certified that error appears in the above-identified patent and that said Letters Patent is hereby corrected as shown below:

On the title page, Item (73), the Assignee's name is incorrect. Item (73), should read:

--(73) Assignee: Furukawa Electric Co., Ltd., Tokyo (JP)--

Signed and Sealed this
Twenty-eighth Day of February, 2012

David J. Kappos
*Director of the United States Patent and Trademark Office*